(12) United States Patent
Masuda et al.

(10) Patent No.: US 11,490,011 B2
(45) Date of Patent: Nov. 1, 2022

(54) BLUR CORRECTION DEVICE, IMAGING APPARATUS, MONITORING SYSTEM, AND PROGRAM

(71) Applicant: FUJIFILM Corporation, Tokyo (JP)

(72) Inventors: Tomonori Masuda, Saitama (JP); Masahiko Sugimoto, Saitama (JP); Yi Pan, Saitama (JP); Takashi Hashimoto, Saitama (JP); Tetsuya Fujikawa, Saitama (JP); Yasunobu Kishine, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 17/402,582

(22) Filed: Aug. 15, 2021

(65) Prior Publication Data

US 2021/0377446 A1 Dec. 2, 2021

Related U.S. Application Data

(63) Continuation of application No. PCT/JP2020/005286, filed on Feb. 12, 2020.

(30) Foreign Application Priority Data

Feb. 18, 2019 (JP) .............................. JP2019-026813

(51) Int. Cl.
*H04N 5/232* (2006.01)

(52) U.S. Cl.
CPC ....... *H04N 5/23277* (2013.01); *H04N 5/2329* (2013.01); *H04N 5/23245* (2013.01); *H04N 5/23267* (2013.01)

(58) Field of Classification Search
CPC ............. H04N 5/2324; H04N 5/23267; H04N 5/23274; H04N 5/2329
See application file for complete search history.

(56) References Cited

U.S. PATENT DOCUMENTS

| 2008/0095459 | A1* | 4/2008 | Vitsnudel | ........... H04N 5/23267 348/308 |
| 2009/0316010 | A1* | 12/2009 | Nomura | ............. H04N 5/23287 348/208.6 |

(Continued)

FOREIGN PATENT DOCUMENTS

| JP | 2003234946 | 8/2003 |
| JP | 2015212739 | 11/2015 |

(Continued)

OTHER PUBLICATIONS

"International Search Report (Form PCT/ISA/210) of PCT/JP2020/005286," dated Mar. 24, 2020, with English translation thereof, pp. 1-5.

(Continued)

*Primary Examiner* — Paul M Berardesca
(74) *Attorney, Agent, or Firm* — JCIPRNET

(57) ABSTRACT

A blur correction device includes: an acquisition unit that acquires an amount of blur correction used to correct blurring of an image obtained through imaging of an imaging element during exposure for one frame in the imaging element; and a correction unit that corrects the blurring by performing image processing on a correction target image, which is an image for one frame included in a moving image obtained through imaging of the imaging element, based on the amount of blur correction acquired by the acquisition unit during exposure necessary to obtain the correction target image.

16 Claims, 25 Drawing Sheets

(56) References Cited

U.S. PATENT DOCUMENTS

| | | | |
|---|---|---|---|
| 2015/0317775 A1 | 11/2015 | Miyahara | |
| 2016/0057352 A1 | 2/2016 | Yoneda et al. | |
| 2017/0026558 A1* | 1/2017 | Park | H04N 5/3456 |
| 2017/0187961 A1* | 6/2017 | Katz | H04N 5/23267 |
| 2017/0251146 A1 | 8/2017 | Ikeda | |

FOREIGN PATENT DOCUMENTS

| | | |
|---|---|---|
| JP | 2017152995 | 8/2017 |
| JP | 2017200107 | 11/2017 |
| WO | 2014156731 | 10/2014 |

OTHER PUBLICATIONS

"Written Opinion of the International Searching Authority (Form PCT/ISA/237) of PCT/JP2020/005286," dated Mar. 24, 2020, with English translation thereof, pp. 1-7.
"International Preliminary Report on Patentability (Form PCT/IPEA/409) of PCT/JP2020/005286," completed on Aug. 18, 2020, with English translation thereof, pp. 1-7.
"Written Opinion of the International Preliminary Examing Authority (Form PCT/IPEA/408) of PCT/JP2020/005286," dated Jun. 16, 2020, with English translation thereof, pp. 1-9.

* cited by examiner

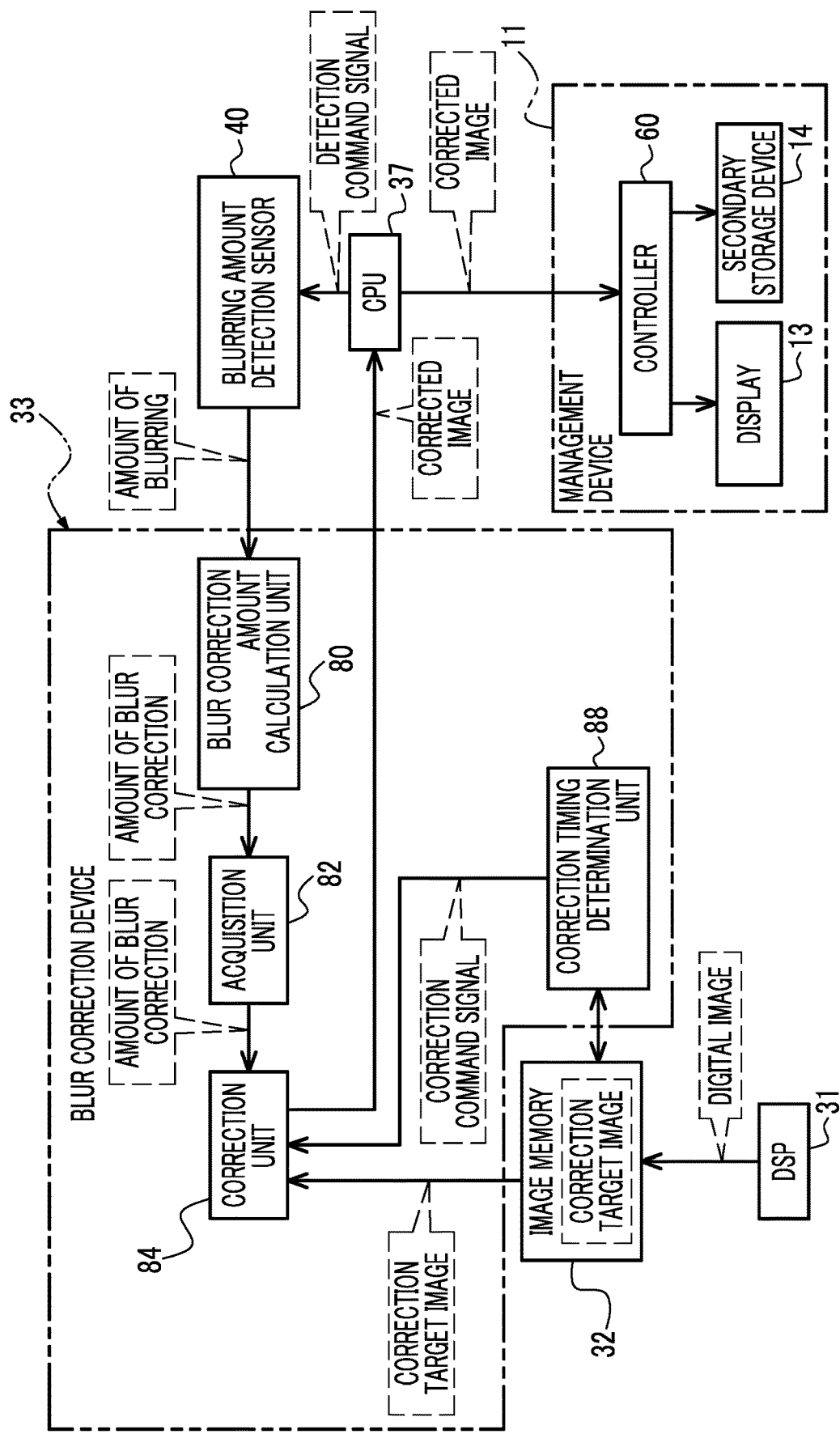

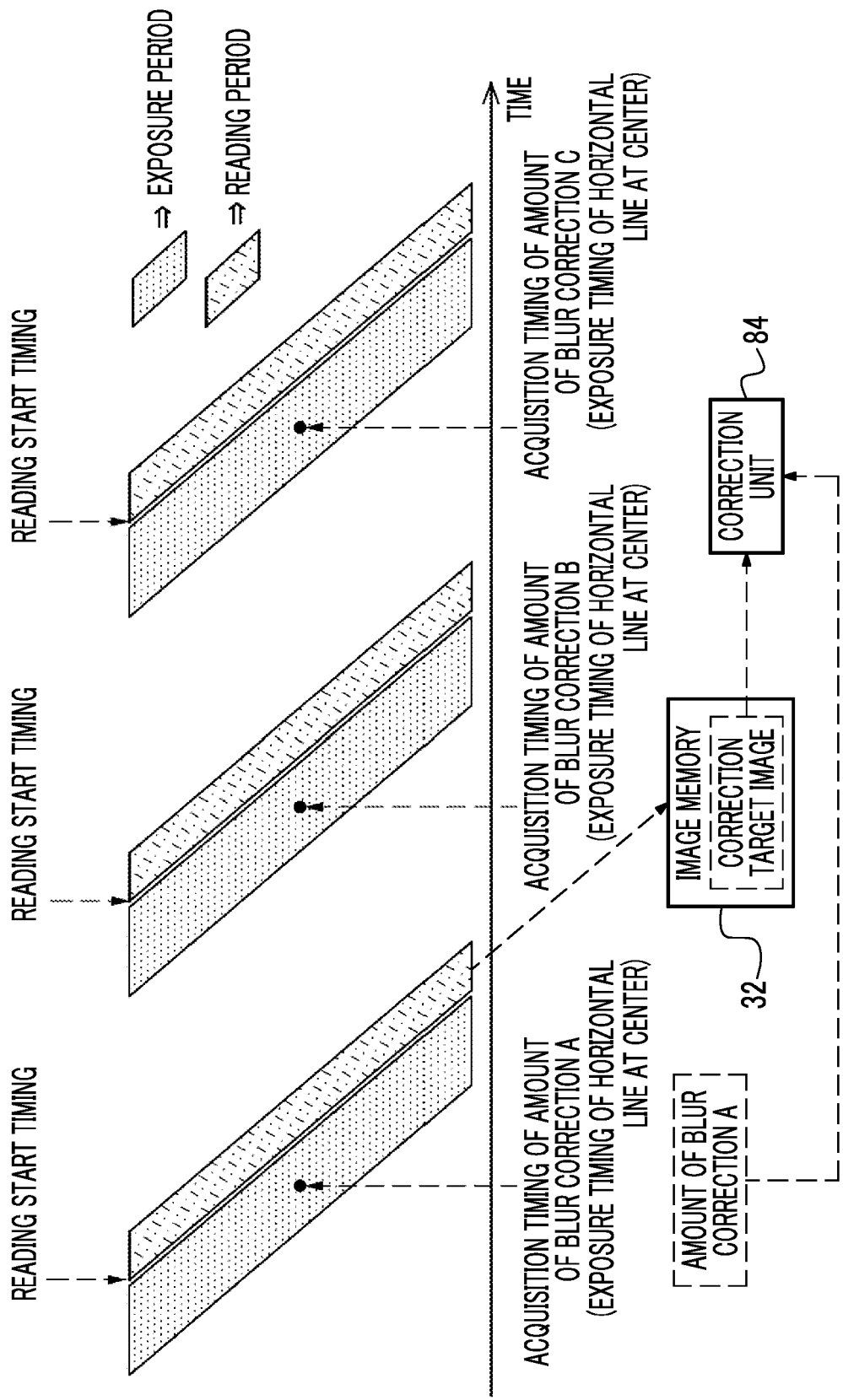

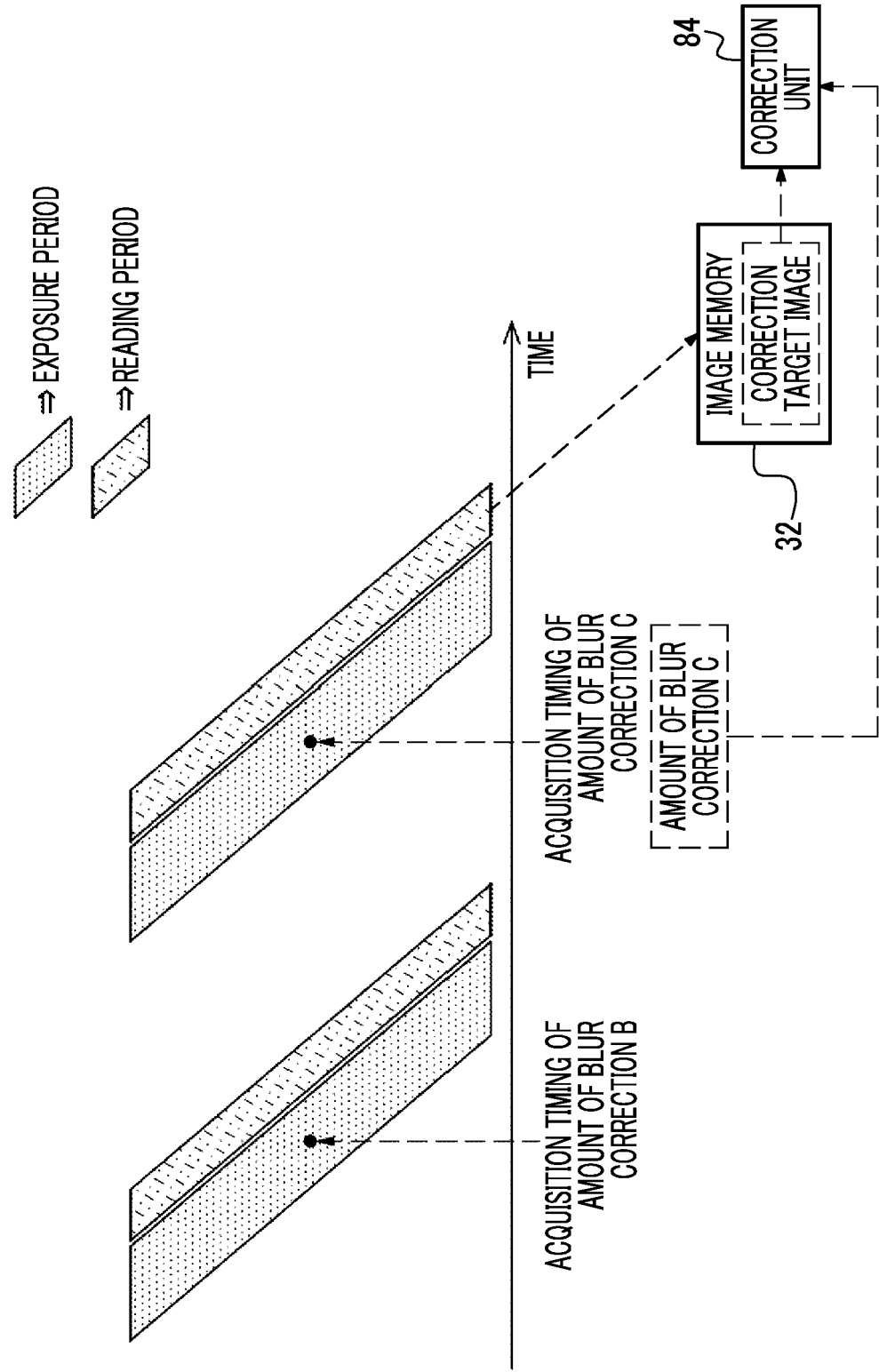

BLUR CORRECTION DEVICE, IMAGING APPARATUS, MONITORING SYSTEM, AND PROGRAM

CROSS-REFERENCE TO RELATED APPLICATIONS

This application is a continuation application of International Application No. PCT/JP2020/005286, filed Feb. 12, 2020, the disclosure of which is incorporated herein by reference in its entirety. Further, this application claims priority under 35 USC 119 from Japanese Patent Application No. 2019-026813 filed Feb. 18, 2019, the disclosure of which is incorporated by reference herein.

BACKGROUND

1. Technical Field

A technique of the present disclosure relates to a blur correction device, an imaging apparatus, a monitoring system, and a program.

2. Related Art

In the following description, in an imaging apparatus in which an image of the subject light indicating a subject is formed on a light receiving surface through an optical system, the term "blurring" means a phenomenon in which a subject image obtained by forming the image of subject light on the light receiving surface fluctuates since a positional relationship between an optical axis of an optical system and the light receiving surface changes due to oscillation given to the imaging apparatus.

The subject image formed on the image forming surface of the imaging apparatus is roughly divided into an optical image and an image which is an electronic image. A mechanical correction unit corrects blurring of the optical image, and an electronic correction unit corrects blurring of the image. In order to correct blurring of the subject image, the amount of blur correction derived based on the detected amount of blurring is used. The mechanical correction unit corrects blurring by mechanically moving the optical system and/or the imaging element based on the amount of blur correction. The electronic correction unit corrects the blurring by performing image processing on the image based on the amount of blur correction.

Generally, it is preferable to correct the blurring using the amount of blur correction acquired at the center position of the exposure period for one frame (refer to, for example, JP2003-234946A).

FIG. 23 shows the relationship between the exposure period for three consecutive frames included in the moving image obtained through imaging and the reading period for reading the image from the imaging element. In the imaging apparatus, in a case where imaging is performed by the rolling shutter method, as shown in FIG. 23, an amount of blur correction is acquired at the center position of the exposure period (at the time in the middle of the exposure period) by the imaging element for each imaging of each frame. Then, the acquired amount of blur correction is used for blur correction of the image which is read from the imaging element.

In a case where imaging is performed by the rolling shutter method, as shown in FIG. 23, in imaging of each frame, the timing at which the amount of blur correction is acquired (hereinafter, also simply referred to as "acquisition timing") is later than the timing at which the reading of the image from the imaging element is started (hereinafter, also simply referred to as "reading start timing").

Therefore, in the example shown in FIG. 23, the amount of blur correction A acquired at the center position of the exposure period of the first frame is provided for correction of blurring in the image of the first frame which is read from the imaging element after the acquisition timing of the amount of blur correction A. Further, the amount of blur correction B acquired at the center position of the exposure period of the second frame is provided for correction of blurring in the image of the second frame which is read from the imaging element after the acquisition timing of the amount of blur correction B. Moreover, the amount of blur correction C acquired at the center position of the exposure period of the third frame is provided for correction of blurring in the image of the third frame which is read from the imaging element after the acquisition timing of the amount of blur correction C.

SUMMARY

According to an embodiment relating to the technique of the present disclosure, there are provided a blur correction device, an imaging apparatus, a monitoring system, and a program capable of correcting blurring of a moving image obtained through imaging with high accuracy, as compared with a case where blur correction is performed based on a common amount of blur correction for each image of two adjacent frames included in a moving image obtained through imaging.

According to a first aspect relating to the technique of the present disclosure, there is a blur correction device including: an acquisition unit that acquires an amount of blur correction used to correct blurring of an image obtained through imaging of an imaging element during exposure for one frame in the imaging element; and a correction unit that corrects the blurring by performing image processing on a correction target image, which is an image for one frame included in a moving image obtained through imaging of the imaging element, based on the amount of blur correction acquired by the acquisition unit during exposure necessary to obtain the correction target image. As a result, as compared with the case where blur correction is performed based on a common amount of blur correction for each image of two adjacent frames included in the moving image obtained through imaging, it is possible to correct blurring of the moving image obtained through imaging with high accuracy.

According to a second aspect of the technique of the present disclosure, in the blur correction device according to the first aspect, the storage unit stores the correction target image, and the correction unit corrects the blurring by performing the image processing on the correction target image stored in the storage unit based on the amount of blur correction acquired by the acquisition unit during the exposure necessary to obtain the correction target image. As a result, even in a case where the timing at which the amount of blur correction is acquired is later than the timing at which the image reading is started, it is possible to correct blurring of the correction target image of the same frame based on the amount of blur correction acquired within one frame included in the moving image.

According to a third aspect relating to the technique of the present disclosure, in the blur correction device according to the second aspect, the storage unit stores the image for each frame, and each of the images stored in the storage unit for each frame is the correction target image. As a result, as compared with the case where blur correction is performed based on a common amount of blur correction for each image of two adjacent frames included in the moving image obtained through imaging, it is possible to correct blurring of each correction target image for each frame included in the moving image with high accuracy.

According to a fourth aspect relating to the technique of the present disclosure, in the blur correction device according to the first aspect, in a case where a first reading period in which the imaging element reads the image of a previous frame of previous and subsequent frames which are adjacent does not overlap with a second reading period in which the imaging element reads the image of the subsequent frame, the correction unit corrects the blurring by performing the image processing on the correction target image of the subsequent frame based on the amount of blur correction acquired by the acquisition unit during exposure between the first reading period and the second reading period. As a result, it is possible to prevent the amount of blur correction acquired during the exposure of the previous frame from affecting the blur correction for the correction target image of the subsequent frame of the previous and subsequent frames which are adjacent.

According to a fifth aspect relating to the technique of the present disclosure, in the blur correction device according to the fourth aspect, the correction unit corrects the blurring by performing the image processing on the correction target image of the subsequent frame based on the amount of blur correction acquired by the acquisition unit throughout an entire exposure period for one frame between the first reading period and the second reading period. As a result, the accuracy of blur correction can be improved as compared with the case where the blurring is corrected based on only one amount of blur correction.

According to a sixth aspect relating to the technique of the present disclosure, in the blur correction device according to any one of the first to fourth aspects, the acquisition unit acquires the amount of blur correction during exposure of a specific line in a period in which exposure corresponding to the correction target image is performed. As a result, it is possible to correct blurring of the correction target image based on the amount of blur correction acquired during the exposure of the specific line in the period in which the exposure corresponding to the correction target image is performed.

According to a seventh aspect relating to the technique of the present disclosure, in the blur correction device according to any one of the first to sixth aspects, the acquisition unit acquires the amount of blur correction at a time earlier than a start point of reading the image from the imaging element during the exposure of a first frame. As a result, it is possible to correct blurring of the correction target image in the first frame based on the amount of blur correction acquired in the first frame.

According to an eighth aspect relating to the technique of the present disclosure, in the blur correction device according to any one of the first to seventh aspects, the correction unit corrects the blurring in a first correction mode or a second correction mode, the first correction mode is a correction mode for correcting the blurring by performing the image processing on the correction target image based on the amount of blur correction acquired by the acquisition unit during the exposure necessary to obtain the correction target image, and the second correction mode is a correction mode for correcting the blurring by performing the image processing on an unfinished image, which is the image less than one frame being read from the imaging element, based on the latest acquired amount of blur correction acquired by the acquisition unit. As a result, in the first correction mode, it is possible to realize a higher accuracy of blur correction than in the second correction mode, and in the second correction mode, it is possible to realize a higher speed of blur correction than in the first correction mode.

According to a ninth aspect relating to the technique of the present disclosure, in the blur correction device according to the eighth aspect, the correction unit corrects the blurring in the first correction mode in a case where a storage medium stores the moving image. As a result, it is possible to save a moving image with higher accuracy of blur correction as compared with the case of correcting blurring of an unfinished image in the second correction mode.

According to a tenth aspect relating to the technique of the present disclosure, in the blur correction device according to any one of the eighth and ninth aspects, the correction unit corrects the blurring in the second correction mode in a case of displaying a live view image on a display unit. As a result, a moving image which is highly close to a real-time image can be displayed on the display unit as compared with the case where the corrected image obtained by correcting blurring of the correction target image is displayed on the display unit after waiting for the correction target image to be stored in the storage unit.

According to an eleventh aspect relating to the technique of the present disclosure, in the blur correction device according to the eighth aspects, the correction unit corrects the blurring in a correction mode, which is determined in accordance with reading start timing of starting reading of the image from the imaging element and acquisition timing of the amount of blur correction acquired by the acquisition unit, in the first correction mode and the second correction mode. As a result, it is possible to correct the blurring in an appropriate correction mode as compared with the case where the blurring is corrected in a correction mode, which is determined regardless of the reading start timing and the acquisition timing of the amount of blur correction acquired by the acquisition unit, in the first correction mode and the second correction mode.

According to a twelfth aspect of the technique of the present disclosure, in the blur correction device according to eleventh aspect, in imaging for one frame through the imaging element, the correction unit corrects the blurring in the first correction mode in a case where the acquisition timing is before the reading start timing, and corrects the blurring in the second correction mode in a case where the acquisition timing is later than the reading start timing. As a result, it is possible to correct the blurring in an appropriate correction mode as compared with the case where the blurring is corrected in a correction mode, which is determined regardless of the relationship between the reading start timing and the acquisition timing of the amount of blur correction acquired by the acquisition unit, in the first correction mode and the second correction mode.

According to a thirteenth aspect relating to the technique of the present disclosure, in the blur correction device according to the eighth aspect, the correction unit corrects the blurring in the first correction mode in a case of transmitting the moving image to an external device. As a result, it is possible to transmit a moving image to an external device with higher accuracy of blur correction than in the case of correcting blurring of an unfinished image in the second correction mode.

According to a fourteenth aspect relating to the technique of the present disclosure, there is an imaging apparatus including a blur correction device and an imaging element according to any one of the first to thirteenth aspects. As a result, as compared with the case where blur correction is performed based on a common amount of blur correction for each image of two adjacent frames included in the moving image obtained through imaging, it is possible to correct blurring of the moving image obtained through imaging with high accuracy.

According to a fifteenth aspect relating to the technique of the present disclosure, there is a monitoring system including: the imaging apparatus according to the fourteenth aspect; and a controller that performs at least one of a control for displaying a corrected image obtained by causing a correction unit to correct blurring on a display unit or a control for storing the corrected image in a storage device. As a result, as compared with the case where blur correction is performed based on a common amount of blur correction for each image of two adjacent frames included in the moving image obtained through imaging, it is possible to correct blurring of the moving image obtained through imaging with high accuracy.

According to a sixteenth aspect relating to the technique of the present disclosure, there is a program for causing a computer to function as an acquisition unit and a correction unit included in a blur correction device according to any one of the first to thirteenth aspects. As a result, as compared with the case where blur correction is performed based on a common amount of blur correction for each image of two adjacent frames included in the moving image obtained through imaging, it is possible to correct blurring of the moving image obtained through imaging with high accuracy.

According to a seventeenth aspect relating to the technique of the present disclosure, there is a blur correction device including a processor. The processor acquires an amount of blur correction used to correct blurring of an image obtained through imaging of an imaging element during exposure for one frame in the imaging element, and corrects the blurring by performing image processing on a correction target image, which is an image for one frame included in a moving image obtained through imaging of the imaging element, based on the amount of blur correction acquired during exposure necessary to obtain the correction target image. As a result, as compared with the case where blur correction is performed based on a common amount of blur correction for each image of two adjacent frames included in the moving image obtained through imaging, it is possible to correct blurring of the moving image obtained through imaging with high accuracy.

BRIEF DESCRIPTION OF THE DRAWINGS

Exemplary embodiments of the technology of the disclosure will be described in detail based on the following figures, wherein:

FIG. 5 is a block diagram showing an example of a function of a blur correction device, which is included in the surveillance camera according to the first embodiment, and peripheral devices thereof;

FIG. 6A is a conceptual diagram for explaining a case where blurring in a correction target image of the first frame included in a moving image obtained through imaging of the surveillance camera according to the first embodiment is corrected;

FIG. 6C is a conceptual diagram for explaining a case where blurring in a correction target image of a second frame included in a moving image obtained through imaging of a surveillance camera according to the first embodiment is corrected;

DETAILED DESCRIPTION

Hereinafter, an example of the embodiment of the technique of the present disclosure will be described with reference to the drawings.

First, the wording used in the following description will be described.

CPU refers to the abbreviation of "Central Processing Unit". RAM refers to the abbreviation of "Random Access Memory". ROM refers to the abbreviation of "Read Only Memory".

ASIC refers to the abbreviation of "Application Specific Integrated Circuit". PLD refers to the abbreviation of "Programmable Logic Device". FPGA refers to the abbreviation of "Field-Programmable Gate Array". AFE refers to the abbreviation of "Analog Front End". DSP refers to the abbreviation of "Digital Signal Processor". SoC refers to the abbreviation of "System-on-a-chip".

SSD refers to the abbreviation of "Solid State Drive". DVD-ROM refers to the abbreviation of "Digital Versatile Disc Read Only Memory". USB refers to the abbreviation of "Universal Serial Bus". HDD refers to the abbreviation of "Hard Disk Drive". EEPROM refers to the abbreviation of "Electrically Erasable and Programmable Read Only Memory".

CCD refers to the abbreviation of "Charge Coupled Device". CMOS refers to the abbreviation of "Complementary Metal Oxide Semiconductor". EL refers to the abbreviation of "Electro-Luminescence". A/D refers to the abbreviation of "Analog/Digital". I/F refers to the abbreviation of "Interface". UI refers to the abbreviation of "User Interface". WAN refers to the abbreviation of "Wide Area Network". Further, in the following description, in a case where the term "image" other than the "image" displayed on the display is used, the "image" also includes the meaning of "data indicating the image".

First Embodiment

Figure 1:
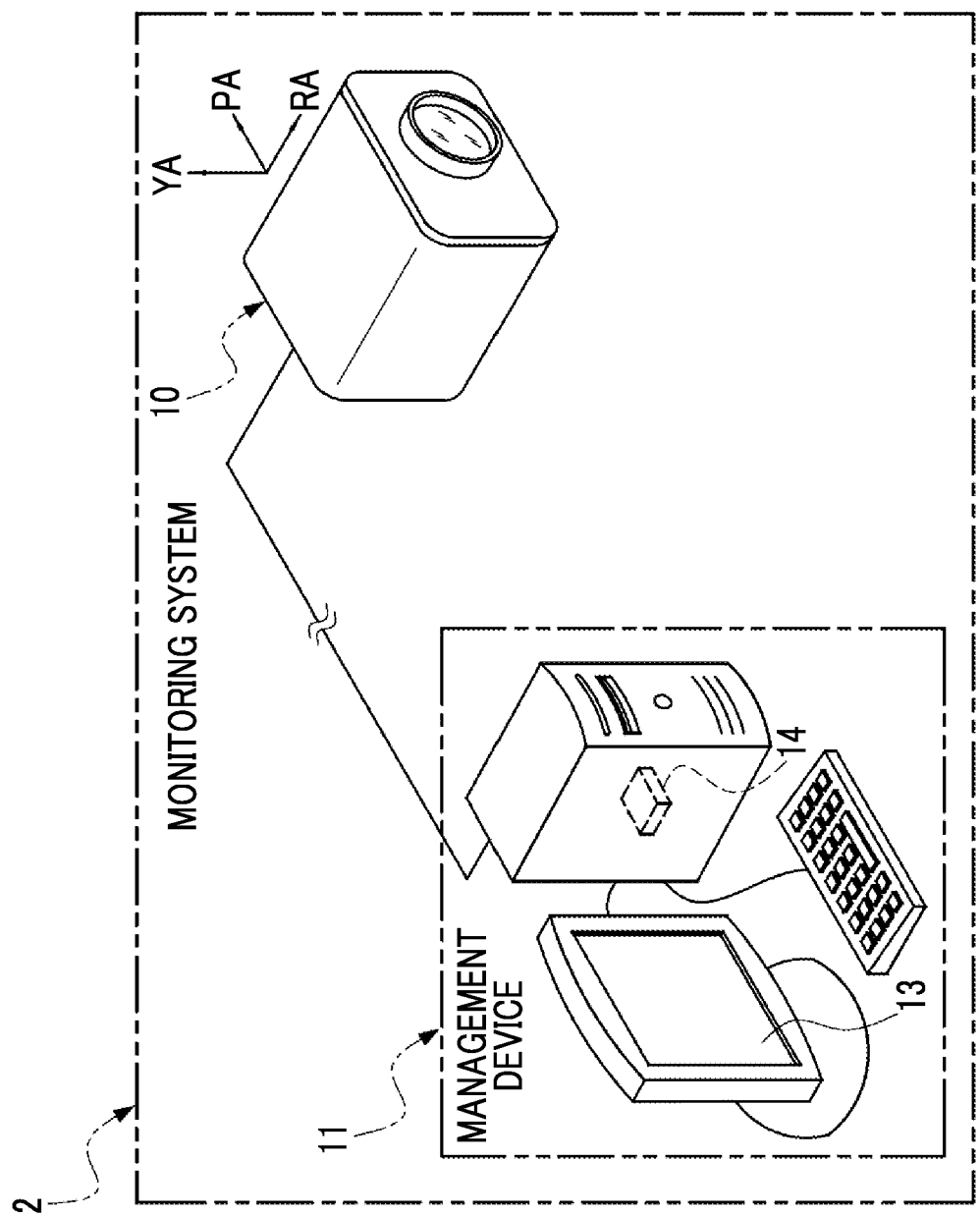
FIG. 1 is a schematic configuration diagram showing an example of a configuration of a monitoring system according to the first to third embodiments.

In FIG. 1, the monitoring system 2 includes a surveillance camera 10 and a management device 11. The monitoring system 2 is an example of a "monitoring system" relating to the technique of the present disclosure, the surveillance camera 10 is an example of an "imaging apparatus" relating to the technique of the present disclosure, and the management device 11 is an example of an "external device" relating to the technique of the present disclosure.

The surveillance camera 10 is installed on a pillar or wall in indoor and outdoor situations, captures an image of a monitoring target as a subject, and generates a moving image through imaging. The moving image includes a multi-frame image obtained through imaging. The surveillance camera 10 transmits the moving image, which is obtained through imaging to the management device 11, through the communication line 12.

The management device 11 includes a display 13 and a secondary storage device 14. Examples of the display 13 include a liquid crystal display and an organic EL display. The display 13 is an example of a "display unit (display)" relating to the technique of the present disclosure.

An HDD is mentioned as an example of the secondary storage device 14. The secondary storage device 14 may be a non-volatile memory such as a flash memory, SSD, or EEPROM instead of an HDD. The secondary storage device 14 is an example of a "storage device" relating to the technique of the present disclosure.

In the management device 11, the moving image transmitted by the surveillance camera 10 is received, and the received moving image is displayed on the display 13 or stored in the secondary storage device 14.

Figure 2:
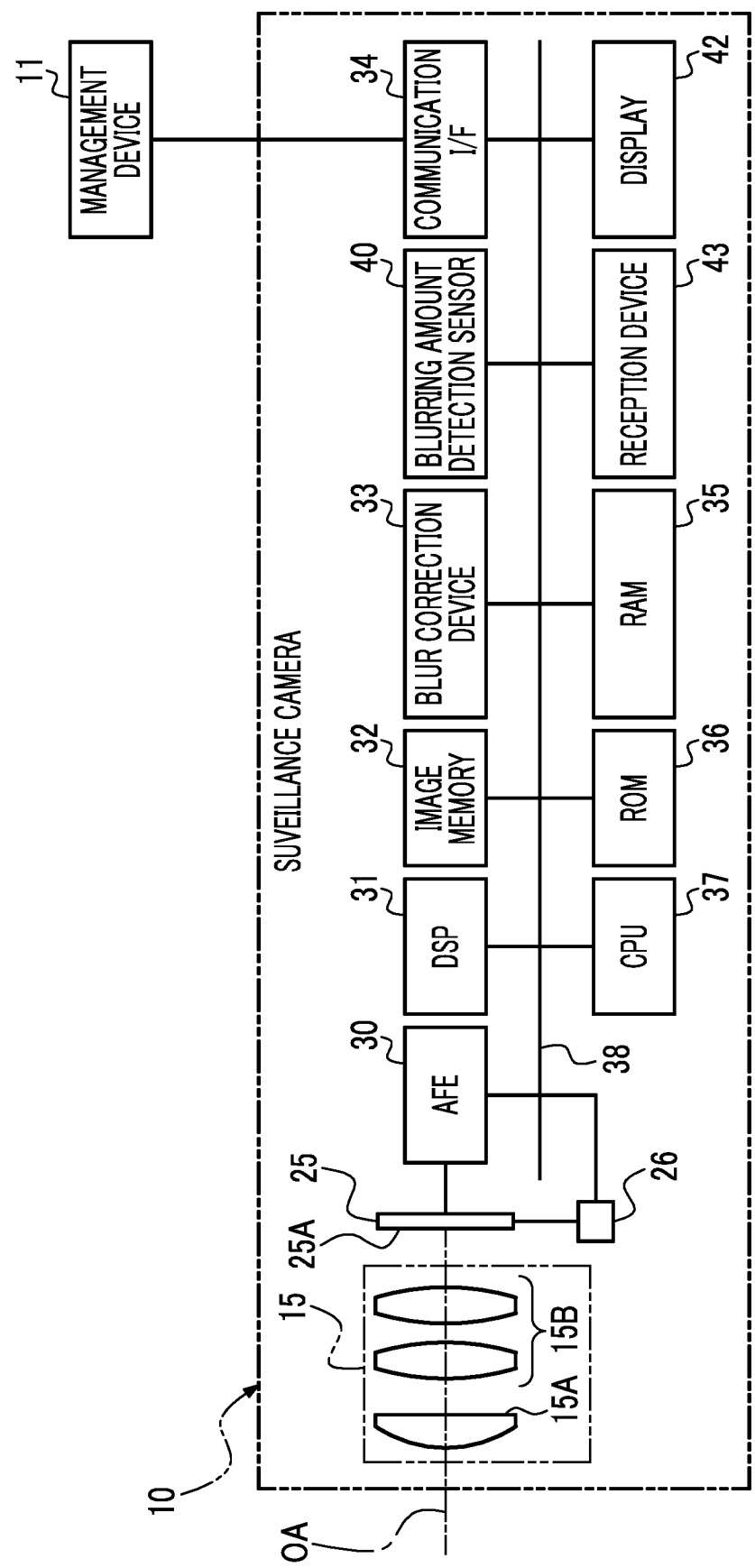
FIG. 2 is a block diagram showing an example of a configuration of an optical system and an electrical system of a surveillance camera according to the first to third embodiments.

As an example, as shown in FIG. 2, the surveillance camera 10 includes an optical system 15 and an imaging element 25. The imaging element 25 is located after the optical system 15. The optical system 15 includes an objective lens 15A and a lens group 15B. The objective lens 15A and the lens group 15B are arranged in a range from the monitoring target side to the light receiving surface 25A side of the imaging element 25 along the optical axis OA of the optical system 15 in the order of the objective lens 15A and the lens group 15B. The lens group 15B includes a focusing lens, a zoom lens, and the like that can move along the optical axis OA, and the focusing lens and the zoom lens move along the optical axis OA in accordance with the applied power. With the optical system 15 configured in such a manner, an image of the monitoring target light indicating the monitoring target is formed on the light receiving surface 25A. The imaging element 25 is an example of an "imaging element" relating to the technique of the present disclosure. Here, a CCD image sensor is employed as the imaging element 25, but this is merely an example, and the imaging element 25 may be another image sensor such as a CMOS image sensor.

The surveillance camera 10 includes a driver 26, an AFE 30, a DSP 31, an image memory 32, a blur correction device 33, a communication I/F 34, a RAM 35, a ROM 36, a CPU 37, a blurring amount detection sensor 40, a display 42, and a reception device 43. Each of the driver 26, the AFE 30, the DSP 31, the image memory 32, the blur correction device 33, the communication I/F 34, the CPU 37, the ROM 36, the RAM 35, the blurring amount detection sensor 40, the display 42, and the reception device 43 is connected to the bus line 38. The blur correction device 33 is an example of the "blur correction device" relating to the technique of the present disclosure. Further, the image memory 32 is an example of the "memory" relating to the technique of the present disclosure.

Various programs for the surveillance camera 10 (hereinafter, simply referred to as "imaging apparatus programs")

are stored in the ROM 36. The CPU 37 reads the imaging apparatus program from the ROM 36, and develops the read imaging apparatus program into the RAM 35. The CPU 37 controls the entire surveillance camera 10 in accordance with the imaging apparatus program developed in the RAM 35.

Each of the driver 26 and the AFE 30 is connected to the imaging element 25. The imaging element 25 captures an image of the monitoring target at a predetermined frame rate under the control of the driver 26. The "predetermined frame rate" described herein refer to, for example, several frames/second to several tens of frames/second.

The light receiving surface 25A is formed by a plurality of photosensitive pixels (not shown) arranged in a matrix. In the imaging element 25, each photosensitive pixel is exposed, and photoelectric conversion is performed for each photosensitive pixel. The electric charge obtained by performing photoelectric conversion for each photosensitive pixel is an analog imaging signal indicating a monitoring target, and is accumulated in the imaging element 25 as an analog image. Each photosensitive pixel is reset by the driver 26 under the control of the CPU 37 at a timing such as before and after the analog image is read out. The exposure period for each photosensitive pixel is determined depending on the shutter speed, and the shutter speed is adjusted by controlling the reset timing and the reading timing of the analog image for each photosensitive pixel.

A vertical synchronization signal and a horizontal synchronization signal are input to the imaging element 25 from the driver 26. The vertical synchronization signal is a signal that defines the timing at which transmission of an analog image for one frame is started. The horizontal synchronization signal is a signal that defines the timing at which the output of an analog image for one horizontal line is started. The imaging element 25 starts outputting the analog image to the AFE 30 in frame units in accordance with the vertical synchronization signal which is input from the driver 26, and then starts outputting the analog image to the AFE 30 in horizontal line units in accordance with the horizontal synchronization signal which is input from the driver 26.

The AFE 30 receives the analog image from the imaging element 25. In other words, the analog image is read from the imaging element 25 by the AFE 30. The AFE 30 generates a digital image, which is a digital imaging signal, by performing analog signal processing such as sampling two correlation pile and gain adjustment on the analog image and then performing A/D conversion. Here, the analog image is an example of an "image" as a read target to be read from the imaging element in the "blur correction device" relating to the technique of the present disclosure. Further, the digital image is an example of an "image" as a correction target to be corrected by the correction unit in the "blur correction device" relating to the technique of the present disclosure. In the following, for convenience of explanation, in a case where it is not necessary to distinguish between an analog image and a digital image, the analog image and the digital image are simply referred to as "images".

In the example shown in FIG. 2, the AFE 30 is provided outside the imaging element 25, but the technique of the present disclosure is not limited to this, and the AFE 30 may be integrally incorporated in the imaging element 25.

The DSP 31 performs various kinds of digital signal processing on the digital image. The various kinds of digital signal processing refer to, for example, demosaic processing, noise removal processing, gradation correction processing, color correction processing, and the like. The DSP 31 outputs a digital image after digital signal processing to the image memory 32 for each frame. The image memory 32 stores a digital image from the DSP 31.

By the way, the oscillation given to the surveillance camera 10 includes oscillation caused by the passage of automobiles, oscillation caused by wind, oscillation caused by road construction, and the like in the outdoor situation, and includes oscillation caused by the operation of an air conditioner and oscillation due to the comings and goings of people in the indoor situation. Therefore, in the surveillance camera 10, blurring occurs due to the oscillation given to the surveillance camera 10 (hereinafter, also simply referred to as "oscillation"). In the present embodiment, the "blurring" refers to a phenomenon in which the digital image fluctuates due to a change in the positional relationship between the optical axis OA and the light receiving surface 25A in the surveillance camera 10.

The blurring amount detection sensor 40 is, for example, a gyro sensor. The gyro sensor detects an amount of rotational blurring around each axis (refer to FIG. 1) of the pitch axis PA, the yaw axis YA, and the roll axis RA (for example, the axis parallel to the optical axis OA shown in FIG. 2) as the amount of blurring. The meaning of parallel in the present embodiment includes not only the meaning of perfect parallel but also the meaning of approximately parallel including errors allowed in design and manufacturing.

Although the gyro sensor is mentioned here as an example of the blurring amount detection sensor 40, this is just an example, and the blurring amount detection sensor 40 may be an acceleration sensor. The acceleration sensor detects the amount of blurring in a two-dimensional plane parallel to the pitch axis PA and the yaw axis YA. The blurring amount detection sensor 40 outputs the detected amount of blurring to the CPU 37.

Further, although an example in which the amount of blurring is detected by a physical sensor called the blurring amount detection sensor 40 is given here, the technique of the present disclosure is not limited to this. For example, the movement vector obtained by comparing the digital images which are stored in the image memory 32 and are previous and subsequent in time series may be used as the amount of blurring. Further, the amount of blurring finally used may be derived based on the amount of blurring detected by the physical sensor and the movement vector obtained by the image processing.

The blur correction device 33 is a device including an ASIC (an example of a "processor" relating to the technique of the present disclosure), and acquires an amount of blur correction in accordance with the amount of blurring detected by the blurring amount detection sensor 40. The amount of blur correction is used to correct blurring of the digital image stored in the image memory 32. That is, the blur correction device 33 corrects the blurring by performing image processing on the digital image stored in the image memory 32 based on the acquired amount of blur correction.

In the present embodiment, image cutout processing is adopted as an example of image processing for a digital image. The image cutout processing refers to processing of cutting out a part of an image region from a digital image stored in the image memory 32. In a case where the image cutout processing is performed, the imaging is performed after the imaging region of the imaging element 25 is set larger than a region which is output as a digital image of which blurring is corrected (hereinafter, simply referred to as an "image output region"). The amount of blur correction is, for example, information for specifying an image region other than the image output region of the digital image stored in the image memory 32. In the image cutout processing, the image output region is specified from the digital image stored in the image memory 32 based on the amount of blur correction. Then, the specified image output region is cut out from the digital image stored in the image memory 32, and the cut out image output region is output to the communication I/F 34 through the CPU 37 as a digital image with the blurring corrected.

In the present embodiment, the term "blur correction" includes not only the meaning of eliminating blurring but also the meaning of reducing blurring. The blur correction device 33 outputs a digital image corrected for blurring to the communication I/F 34.

Further, although the device including the ASIC is illustrated here as the blur correction device 33, the technique of the present disclosure is not limited to this, and for example, a device including an FPGA or PLD may be used. Further, for example, the blur correction device 33 may be a device including a plurality of ASICs, FPGAs, and PLDs. Further, as the blur correction device 33, a computer including a CPU, a ROM, and a RAM may be employed. The number of CPUs may be singular or plural. Further, the blur correction device 33 may be realized by a combination of a hardware configuration and a software configuration.

The communication I/F 34 is, for example, a network interface, and controls transmission of various kinds of information to and from the management device 11 through the network. An example of a network is a WAN such as the Internet or a public communication network. The communication I/F 34 performs communication between the surveillance camera 10 and the management device 11. The communication I/F 34 transmits a digital image which is input from the blur correction device 33 through the CPU 37, that is, transmits a digital image whose blurring has been corrected by the blur correction device 33 to the management device 11.

The reception device 43 is, for example, a keyboard, a mouse, a touch panel, or the like, and receives various commands from the user. The CPU 37 acquires various commands received by the reception device 43 and operates in accordance with the acquired commands.

The display 42 displays various kinds of information under the control of the CPU 37. Examples of the various kinds of information displayed on the display 42 include the contents of various commands received by the reception device 43, a digital image in which blurring is corrected by the blur correction device 33, and the like.

Figure 3:
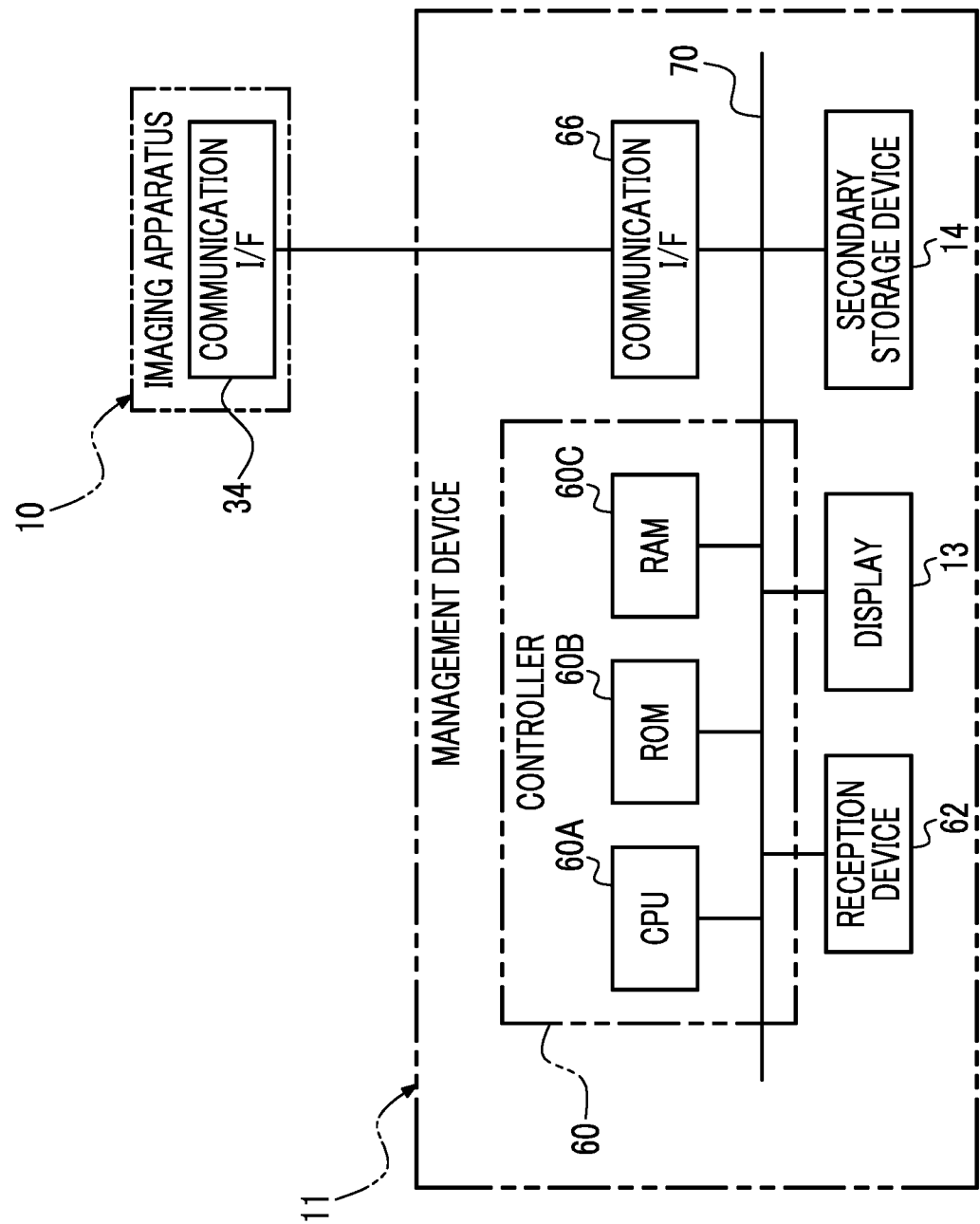
FIG. 3 is a block diagram showing an example of a configuration of an electrical system of a management device according to the first to third embodiments.

As an example, as shown in FIG. 3, the management device 11 includes a display 13, a secondary storage device 14, a controller 60, a reception device 62, and a communication I/F 66. The controller 60 includes a CPU 60A, a ROM 60B, and a RAM 60C. Each of the reception device 62, the display 13, the secondary storage device 14, the CPU 60A, the ROM 60B, the RAM 60C, and the communication I/F 66 is connected to the bus line 70.

Various programs for the management device 11 (hereinafter, simply referred to as "management device programs") are stored in the ROM 60B. The CPU 60A reads the management device program from the ROM 60B, and develops the read management device program into the RAM 60C. The CPU 60A controls the entire management device 11 in accordance with the management device program developed in the RAM 60C.

The communication I/F 66 is, for example, a network interface. The communication I/F 66 is communicably connected to the communication I/F 34 of the management device 11 through a network, and controls transmission of various kinds of information to and from the management device 11. For example, the communication I/F 66 requests the management device 11 to transmit a digital image, and receives the digital image transmitted from the communication I/F 34 of the management device 11 in response to the request for transmission of the digital image.

The reception device 62 is, for example, a keyboard, a mouse, a touch panel, or the like, and receives various commands from the user. The CPU 60A acquires various commands received by the reception device 62 and operates in accordance with the acquired commands.

The display 13 displays various kinds of information under the control of the CPU 60A. Examples of the various kinds of information displayed on the display 13 include the contents of various commands received by the reception device 62, the digital image received by the communication I/F 66, and the like.

The secondary storage device 14 stores various kinds of information under the control of the CPU 60A. Examples of various kinds of information stored in the secondary storage device 14 include digital images received by the communication I/F 66.

in such a manner, the controller 60 performs control for displaying the digital image received by the communication I/F 66 on the display 13, and performs control for storing the digital image received by the communication I/F 66 in the secondary storage device 14.

Here, the digital image is displayed on the display 13 and the digital image received by the communication I/F 66 is stored in the secondary storage device 14, but the technique of the present disclosure is not limited to this. For example, either the display of the digital image on the display 13 or the storage of the digital image in the secondary storage device 14 may be performed.

Figure 4:
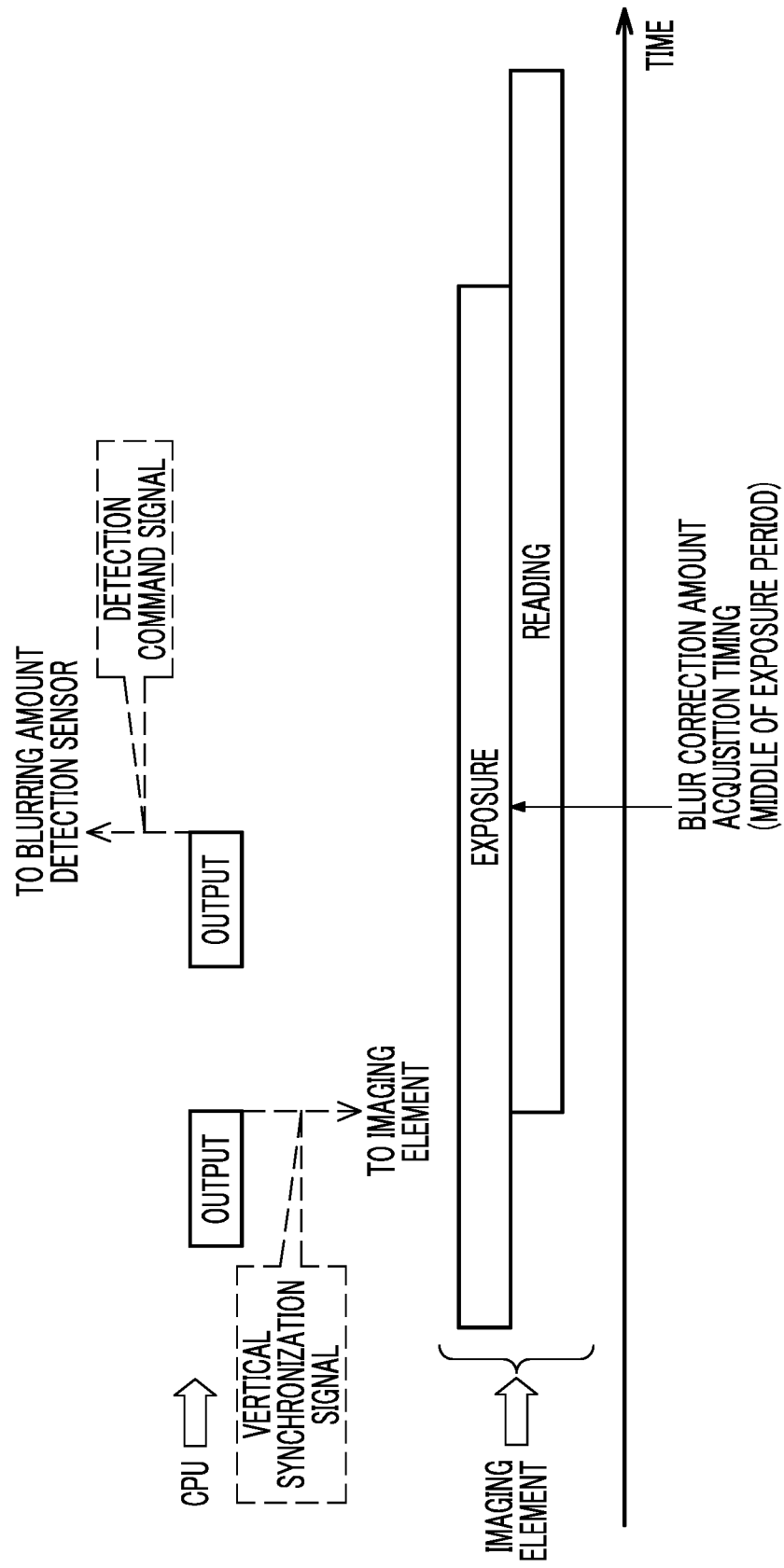
FIG. 4 is a time chart showing an example of a relationship of the output timing of a signal output from the CPU in the surveillance cameras according to the first to third embodiments, the exposure period of the imaging element, and the period in which the analog image is read from the imaging element.

In a case where imaging for a moving image is performed by the surveillance camera 10, as shown in FIG. 4 as an example, the CPU 37 outputs a vertical synchronization signal to the imaging element 25 through the driver 26 (refer to FIG. 1) in frame units. In a case where a vertical synchronization signal is input to the imaging element 25, reading of an analog image is started from the imaging element 25. Then, in a case where a predetermined time (described later) elapses after the vertical synchronization signal is output, the CPU 37 outputs a blurring amount detection signal for commanding the blurring amount detection sensor 40 to detect the amount of blurring. In a case where the blurring amount detection signal is input from the CPU 37, the blurring amount detection sensor 40 detects the amount of blurring and outputs the detected amount of blurring to the blur correction device 33.

As will be described in detail later, the amount of blur correction is calculated in accordance with the amount of blurring detected by the blurring amount detection sensor 40. Then, the blur correction device 33 acquires the amount of blur correction at a blur correction amount acquisition timing. The "blur correction amount acquisition timing" described herein refers to a predetermined timing as a timing at which the amount of blur correction is acquired by the blur correction device 33. In the example shown in FIG. 4, the timing in the middle of the exposure period for one frame is shown as the blur correction amount acquisition timing. The above-mentioned predetermined time is predetermined as, for example, a time required for the CPU 37 to output a detection command signal at the timing of causing the blur correction device 33 to acquire the amount of blur correction at the blur correction amount acquisition timing.

As an example, as shown in FIG. 5, the blur correction device 33 includes an blur correction amount calculation unit 80, an acquisition unit 82, a correction unit 84, and a correction timing determination unit 88. The acquisition unit 82 is an example of the "acquisition unit" relating to the technique of the present disclosure, and the correction unit 84 is an example of the "correction unit" relating to the technique of the present disclosure.

The blur correction amount calculation unit 80 acquires the amount of blurring detected by the blurring amount detection sensor 40, and calculates the amount of blur correction based on the acquired amount of blurring. The blur correction amount calculation unit 80 calculates the amount of blur correction using an arithmetic expression in which the amount of blurring is an independent variable and the amount of blur correction is a dependent variable.

Although a configuration example in which the amount of blur correction is calculated by using an arithmetic expression is given here, the technique of the present disclosure is not limited to this. For example, the amount of blur correction may be derived based on the amount of blur correction derivation table (not shown) in which the amount of blurring and the amount of blur correction are associated with each other.

The acquisition unit 82 acquires the amount of blur correction calculated by the blur correction amount calculation unit 80 at the above-mentioned blur correction amount acquisition timing (refer to FIG. 4). The fact that the amount of blur correction is acquired at the blur correction amount acquisition timing means that the amount of blur correction is acquired during the exposure of one frame by the imaging element 25.

The correction timing determination unit 88 determines whether or not the correction target image is stored in the image memory 32, and outputs a correction command signal, which is for giving a command to correct blurring, to the correction unit 84 in a case where the correction target image is stored in the image memory 32. The correction target image refers to a digital image for one frame included in the moving image obtained through imaging of the imaging element 25. That is, in the blur correction device 33, the digital image for one frame stored in the image memory 32 by the DSP 31 is treated as a correction target image. Further, since the digital image is stored in the image memory 32 for each frame, each of the digital images for each frame is treated as the correction target image.

The correction timing determination unit 88 monitors the stored contents of the image memory 32, determines that the correction target image is stored in the image memory 32 in a case where a digital image for one frame is stored in the image memory 32, and outputs the correction command signal to the correction unit 84.

In a case where the correction command signal from the correction timing determination unit 88 is input, the correction unit 84 acquires the correction target image from the image memory 32, and performs the above-mentioned image cutout processing on the acquired correction target image, thereby correcting the blurring. The correction unit 84 outputs the corrected image, which is obtained by correcting blurring of the correction target image, to the CPU 37, and the CPU 37 transmits the corrected image to the management device 11 through the communication I/F 34.

The blur correction device 33 corrects blurring in the same manner for each digital image included in the moving image obtained through imaging in accordance with the above-mentioned predetermined frame rate. Then, each corrected image obtained by correcting the blurring is sequentially transmitted to the management device 11 through the CPU 37.

In the management device 11, each corrected image transmitted from the CPU 37 of the surveillance camera 10 is sequentially input to the controller 60. Then, the display 13 displays the corrected images, which are sequentially input to the controller 60, as a live view image under the control of the controller 60, and the secondary storage device 14 stores the corrected images, which are sequentially input to the controller 60, under the control of the controller 60. The controller 60 is an example of a "controller" relating to the technique of the present disclosure.

FIG. 6A shows an example of the exposure period and the reading period for each frame from the first frame to the third frame included in the moving image obtained through imaging of the monitoring target. The "exposure period" described herein refers to a period in which the imaging element 25 is exposed, and the reading period refers to a period required for reading an analog image from the imaging element 25.

In the surveillance camera 10, imaging is performed by the rolling shutter method. Therefore, as shown in FIG. 6A as an example, there is a gap between the reading start timing and the reading end timing. The reading start timing is the timing of reading the analog image of the horizontal line of the first line of the imaging region of the imaging element 25, and the reading end timing is the timing of reading the analog image of the horizontal line of the last line of the imaging region of the imaging element 25. In the rolling shutter method, analog images are sequentially read out for each horizontal line from the first line to the last line of the imaging region of the imaging element 25 in accordance with the horizontal synchronization signal. Therefore, the reading end timing arrives later than the reading start timing. Along with this, there is a gap between the timing at which the first row of the imaging region of the imaging element 25 is exposed and the timing at which the last row of the imaging region of the imaging element 25 is exposed.

In each frame, the acquisition unit 82 acquires the amount of blur correction (refer to FIG. 5) at the timing at which exposure is performed on the horizontal line located at the center in the column direction of the imaging region of the imaging element 25. More specifically, the acquisition unit 82 acquires the amount of blur correction at the timing at which exposure is performed on the photosensitive pixel at the center of the horizontal line located at the center of the imaging region of the imaging element 25 in the column direction. The timing, at which exposure is performed on the horizontal line located at the center of the imaging region of the imaging element 25 in the column direction, is an example of "while the exposure of a specific line is being performed in the period in which the exposure corresponding to the correction target image is performed" relating to the technique of the present disclosure.

Here, the acquisition unit 82 acquires the amount of blur correction at the timing at which exposure is performed on the horizontal line located at the center of the imaging region of the imaging element 25 in the column direction, but the technique of the present disclosure is not limited to this. For example, the acquisition unit 82 may acquire the amount of blur correction at the timing at which exposure is performed on a horizontal line located before or after a plurality of lines (for example, several lines to several tens of lines) in the column direction from the horizontal line located in the center of the imaging region of the imaging element 25 in the column direction.

In the example shown in FIG. 6A, the acquisition unit 82 acquires the amount of blur correction A at the timing at which exposure is performed on the horizontal line located at the center of the imaging region of the imaging element 25 in the column direction for the first frame. Then, in a case where the digital image for one frame corresponding to the analog image of the first frame which is read from the imaging element 25 is stored in the image memory 32 as the correction target image, the correction unit 84 performs image cutout processing based on the amount of blur correction A acquired by the acquisition unit 82. As a result, blurring of the correction target image in the first frame is corrected.

Figure 6B:
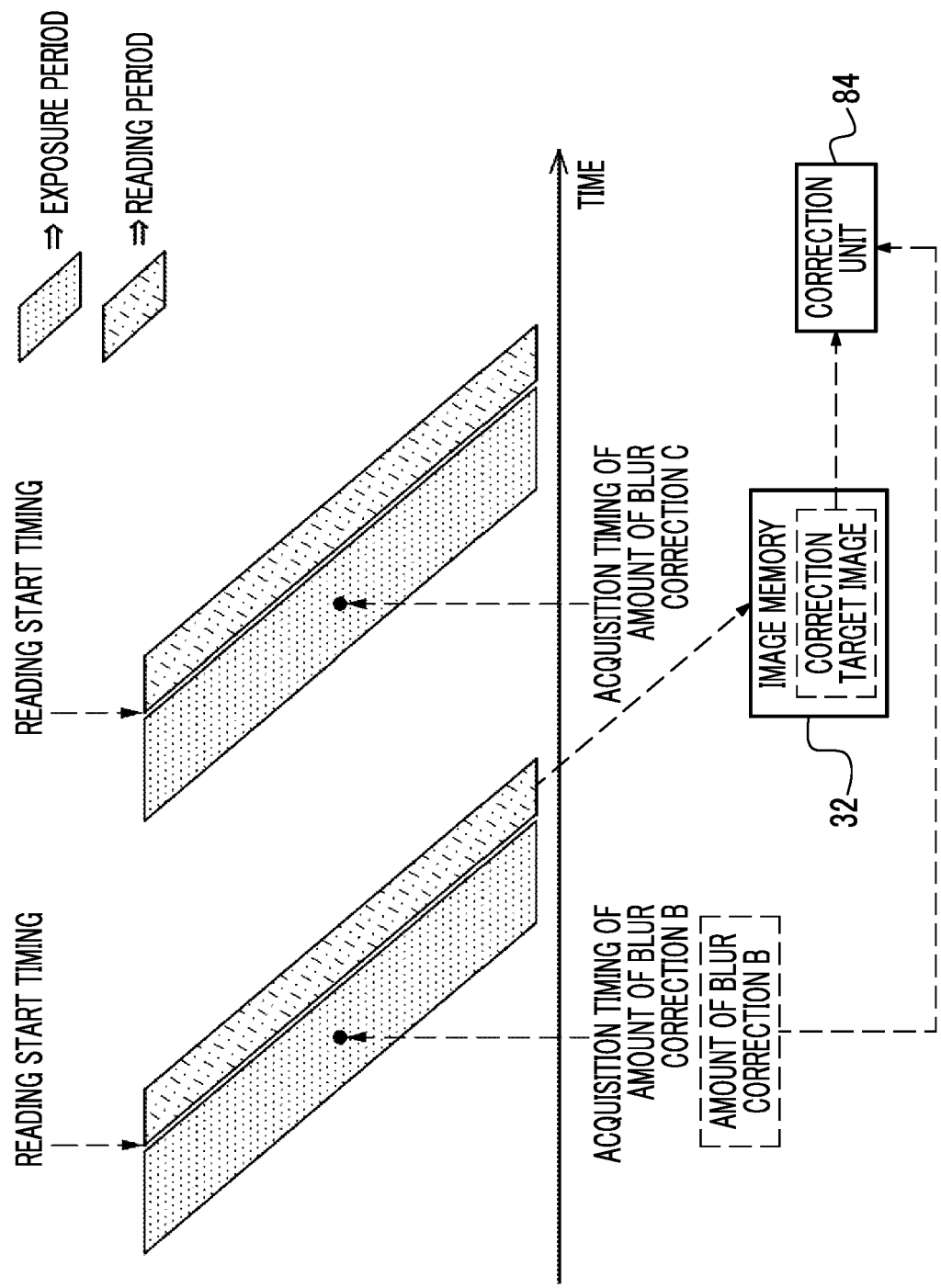
FIG. 6B is a conceptual diagram for explaining a case where blurring in a correction target image in the third frame included in a moving image obtained through imaging of the surveillance camera according to the first embodiment is corrected.

Similarly, in the example shown in FIG. 6B, the acquisition unit 82 acquires the amount of blur correction B at the timing at which exposure is performed on the horizontal line located at the center in the column direction of the imaging region of the imaging element 25 for the second frame. Then, in a case where the digital image for one frame corresponding to the analog image of the second frame which is read from the imaging element 25 is stored in the image memory 32 as the correction target image, the correction unit 84 performs image cutout processing based on the amount of blur correction B acquired by the acquisition unit 82. As a result, blurring of the correction target image in the second frame is corrected.

Similarly, in the example shown in FIG. 6C, the acquisition unit 82 acquires the amount of blur correction C at the timing at which exposure is performed on the horizontal line located at the center in the column direction of the imaging region of the imaging element 25 for the third frame. Then, in a case where the digital image for one frame corresponding to the analog image of the third frame which is read from the imaging element 25 is stored in the image memory 32 as the correction target image, the correction unit 84 performs image cutout processing based on the amount of blur correction C acquired by the acquisition unit 82. As a result, blurring of the correction target image in the third frame is corrected. The same processing is performed for each frame after the third frame included in the moving image obtained through imaging.

Next, the operation of the part of the monitoring system 2 relating to the technique of the present disclosure will be described.

First, the flow of the blur correction processing executed by the blur correction device 33 will be described with reference to FIG. 7.

Figure 7:
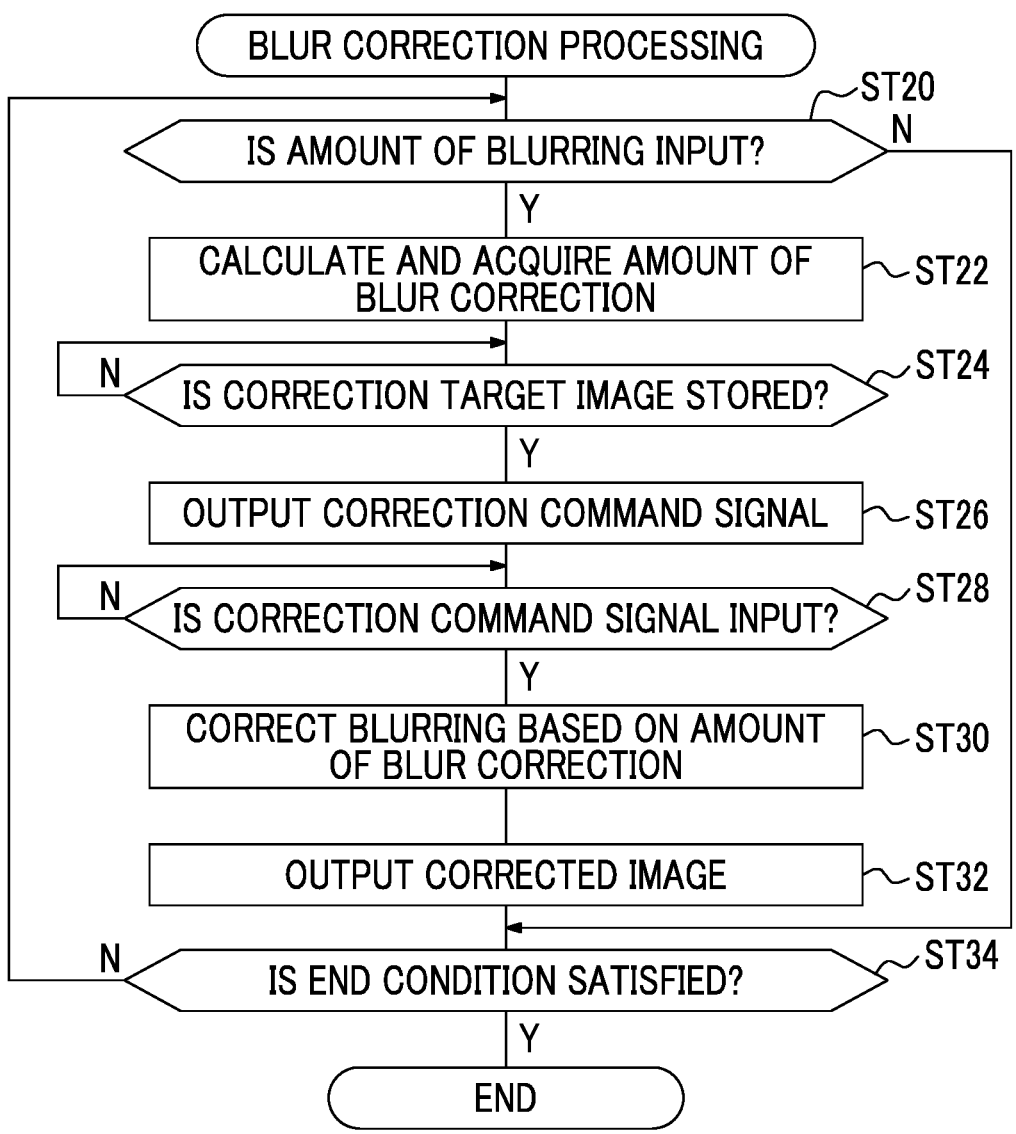
FIG. 7 is a flowchart showing an example of a flow of blur correction processing according to the first embodiment.

In the blur correction processing shown in FIG. 7, first, in step ST20, the blur correction amount calculation unit 80 determines whether or not the amount of blurring detected by the blurring amount detection sensor 40 has been input. In a case where the amount of blurring detected by the blurring amount detection sensor 40 is not input in step ST20, the determination is denied, and the blur correction amount correction processing proceeds to step ST34. In a case where the amount of blurring detected by the blurring amount detection sensor 40 is input in step ST20, the determination is affirmed, and the blur correction processing proceeds to step ST22.

In step ST22, the blur correction amount calculation unit 80 calculates the amount of blur correction based on the input amount of blurring, and outputs the calculated amount of blur correction to the acquisition unit 82. The acquisition unit 82 acquires the amount of blur correction which is output by the blur correction amount calculation unit 80, and then the blur correction processing proceeds to step ST24.

In step ST24, the correction timing determination unit 88 determines whether or not the correction target image is stored in the image memory 32. That is, the correction timing determination unit 88 determines whether or not the digital image for one frame has been stored in the image memory 32. In a case where the correction target image is not stored in the image memory 32 in step ST24, the determination is denied, and the determination in step ST24 is performed again. Here, a case where the correction target image is not stored in the image memory 32 refers to, for example, a case where no digital image is stored in the image memory 32 and a case where the digital image stored in the image memory 32 is less than one frame. In a case where the correction target image is stored in the image memory 32 in step ST24, the determination is affirmed, and the blur correction processing proceeds to step ST26.

In step ST26, the correction timing determination unit 88 outputs the correction command signal to the correction unit 84, and then the blur correction processing proceeds to step ST28.

In step ST28, the correction unit 84 determines whether or not the correction command signal from the correction timing determination unit 88 has been input. In a case where the correction command signal from the correction timing determination unit 88 is not input in step ST28, the determination is denied, and the determination in step ST28 is performed again. In a case where the correction command signal from the correction timing determination unit 88 is input in step ST28, the determination is affirmed, and the blur correction processing proceeds to step ST30.

In step ST30, the correction unit 84 acquires the correction target image stored in the image memory 32. Then, the correction unit 84 corrects blurring of the correction target image by executing the image cutout processing on the acquired correction target image based on the amount of blur correction acquired by the acquisition unit 82 in step ST22. Then, the blur correction processing proceeds to step ST32.

In step ST32, the correction unit 84 outputs the corrected image obtained by correcting blurring of the correction target image to the CPU 37, and then the blur correction processing proceeds to step ST34. The CPU 37 transmits the corrected image which is input from the correction unit 84 to the management device 11 through the communication I/F 34.

In step ST34, the correction unit 84 determines whether or not the condition for ending the blur correction processing (hereinafter, referred to as "blur correction processing end condition") is satisfied. Examples of the blur correction processing end condition include a condition that the reception device 43 receives a command to end the blur correction processing. In a case where the condition for ending the blur correction processing is not satisfied in step ST34, the determination is denied, and the blur correction processing proceeds to step ST20. In a case where the condition for ending the blur correction processing is satisfied in step ST34, the determination is affirmed, and the blur correction processing ends.

Next, the flow of the management processing executed by the controller 60 of the management device 11 will be described with reference to FIG. 8.

Figure 8:
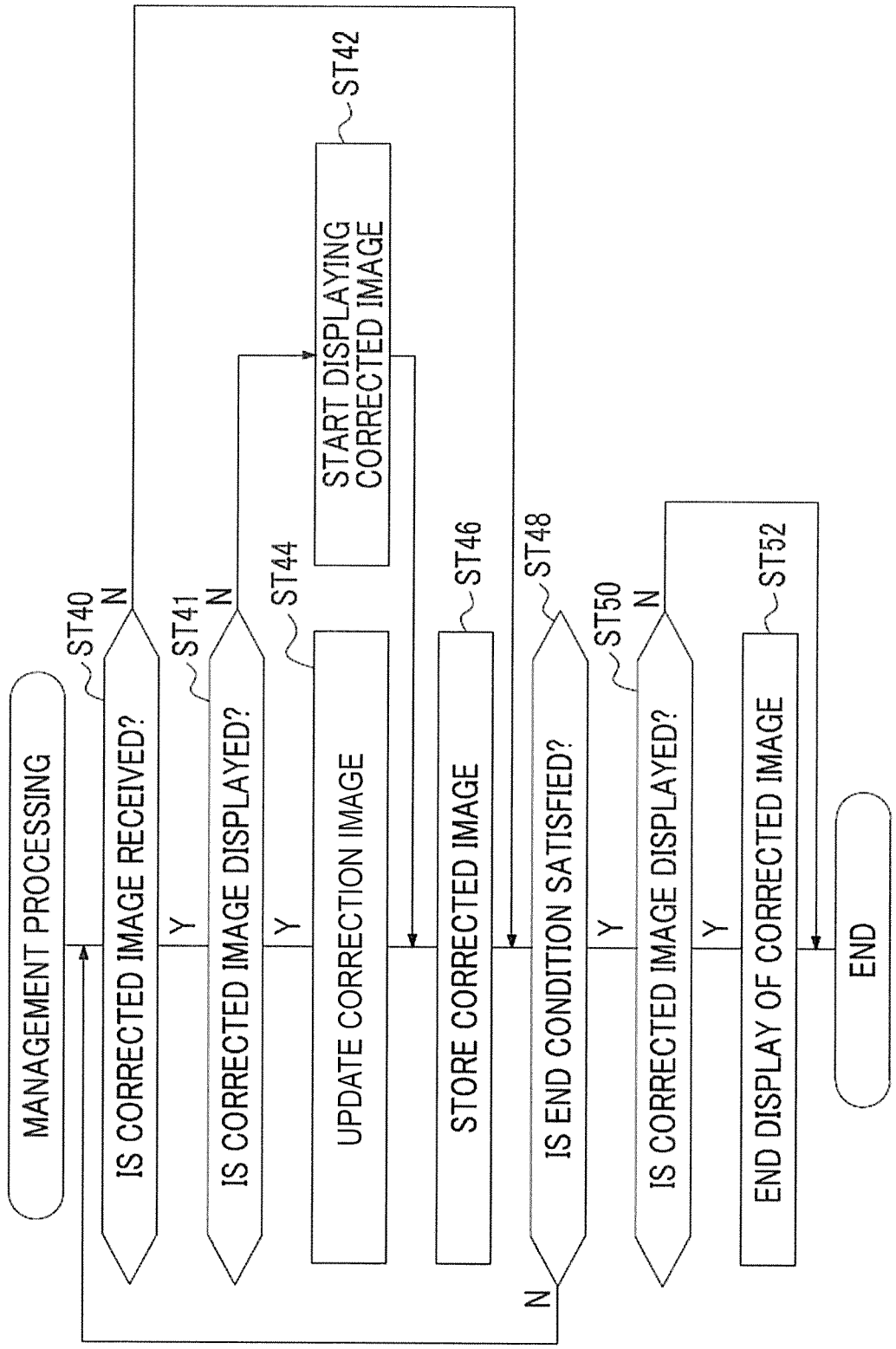
FIG. 8 is a flowchart showing an example of a flow of management processing according to the first embodiment.

In the management processing shown in FIG. 8, first, in step ST40, the controller 60 determines whether or not the communication I/F 66 has received the corrected image transmitted from the surveillance camera 10. In step ST40, in a case where the communication I/F 66 does not receive the corrected image transmitted from the surveillance camera 10, the determination is denied, and the management processing proceeds to step ST48. In step ST40, in a case where the communication I/F 66 does not receive the corrected image transmitted from the surveillance camera 10, the determination is affirmed, and the management processing proceeds to step ST41.

In step ST41, the controller 60 determines whether or not the corrected image is displayed on the display 13. In step ST41, in a case where the corrected image is not displayed on the display 13, that is, in a case where the corrected image is not displayed on the display 13, the determination is denied, and the management processing proceeds to step ST42. In a case where the corrected image is displayed on the display 13 in step ST41, the determination is affirmed, and the management processing proceeds to step ST44.

In step ST42, the controller 60 starts displaying the latest corrected image received by the communication I/F 66 on the display 13, and then the management processing proceeds to step ST46.

In step ST44, the controller 60 updates the corrected image displayed on the display 13 with the latest corrected image received by the communication I/F 66, and then the management processing proceeds to step ST46.

In step ST46, the controller 60 stores the latest corrected image received by the communication I/F 66 in the secondary storage device 14, and then the management processing proceeds to step ST48.

In step ST48, the controller 60 determines whether or not the condition for ending the management processing (hereinafter, referred to as "management processing end condition") is satisfied. Examples of the management processing end condition include a condition that the reception device 62 has received a command to end the management processing. In a case where the management processing end condition is not satisfied in step ST48, the determination is denied, and the management processing proceeds to step ST40. In a case where the management processing end condition is satisfied in step ST48, the determination is affirmed, and the management processing proceeds to step ST50.

In step ST50, the controller 60 determines whether or not the corrected image is displayed on the display 13. In step ST50, in a case where the corrected image is not displayed on the display 13, that is, in a case where the corrected image is not displayed on the display 13, the determination is denied, and the management processing ends. In a case where the corrected image is displayed on the display 13 in step ST50, the determination is affirmed, and the management processing proceeds to step ST52.

In step ST52, the controller 60 ends the display of the corrected image on the display 13, and then the management processing ends.

As described above, in the surveillance camera 10, blurring is corrected by performing image cutout processing as image processing on the correction target image included in the moving image obtained through imaging, based on the amount of blur correction acquired during the exposure necessary to obtain the correction target image. As a result, the blur correction for the digital image of the subsequent frame of the previous and subsequent frames, which are adjacent and included in the moving image, is not affected by the amount of blur correction acquired during the exposure of the previous frame. Accordingly, as compared with the case where blur correction is performed based on a common amount of blur correction for each image of two adjacent frames included in the moving image obtained through imaging, it is possible to correct blurring of the moving image obtained through imaging with high accuracy.

Further, in the surveillance camera 10, blurring is corrected by performing image cutout processing as image processing on the correction target image stored in the image memory 32, based on the amount of blur correction acquired during the exposure necessary to obtain the correction target image. That is, blur correction is performed on the digital image for one frame stored in the image memory 32, based on the amount of blur correction acquired during the exposure necessary to obtain the digital image for one frame currently stored in the image memory 32. Therefore, even in a case where the acquisition timing of the amount of blur correction is later than the reading start timing of the analog image, the blurring can be corrected based on the amount of blur correction acquired within one frame included in the moving image.

Further, in the surveillance camera 10, a digital image is stored in the image memory 32 for each frame, and each of the digital images for each frame stored in the image memory 32 is treated as a correction target image. Accordingly, as compared with the case where blur correction is performed based on a common amount of blur correction for each image of two adjacent frames included in the moving image obtained through imaging, it is possible to correct blurring of each correction target image for each frame included in the moving image with high accuracy.

Further, in the surveillance camera 10, the acquisition unit 82 acquires the amount of blur correction during the exposure of the central horizontal line during the period in which the exposure corresponding to the correction target image is performed. Therefore, it is possible to correct blurring of the correction target image based on the amount of blur correction acquired during the exposure of the central horizontal line during the period in which the exposure corresponding to the correction target image is performed.

Second Embodiment

In the first embodiment, one type of correction method is illustrated as the correction method by the blur correction device 33, but in the second embodiment, a configuration example in which the two types of correction methods are used will be described. In the second embodiment, the same components as those in the first embodiment are represented by the same reference numerals, and the description thereof will not be repeated. Hereinafter, a part different from the first embodiment will be described.

Figure 9:
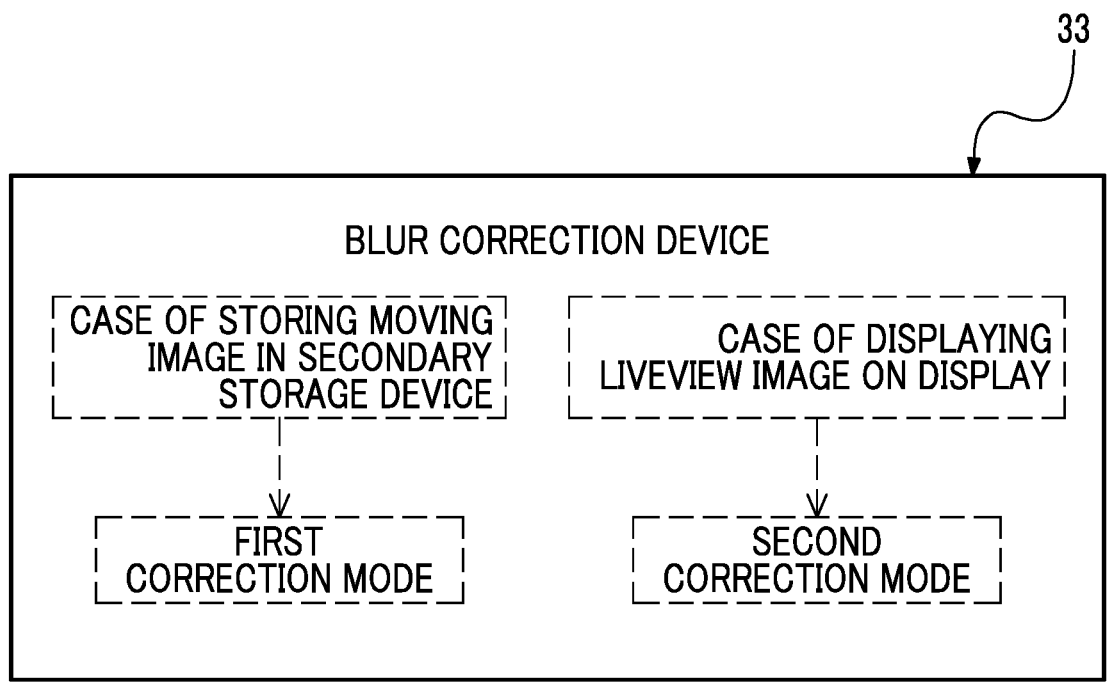
FIG. 9 is a conceptual diagram showing an example of the relationship between a correction mode, which is set for a blur correction device included in the surveillance camera according to a second embodiment, and a condition for setting the correction mode.

As an example, as shown in FIG. 9, the first correction mode or the second correction mode is set for the blur correction device 33, and the correction unit 84 corrects blurring of the moving image, which is obtained through imaging of the surveillance camera 10, in the first correction mode or the second correction mode.

As an example, as shown in FIG. 9, the first correction mode is set for the blur correction device 33, in a case where the moving image obtained through imaging of the surveillance camera 10 is stored in the secondary storage device 14 (refer to FIG. 3) of the management device 11. Further, the second correction mode is set for the blur correction device 33, in a case where the moving image obtained through imaging of the surveillance camera 10 is displayed as a live view image on the display 13 (refer to FIG. 3) of the management device 11.

Figure 10:
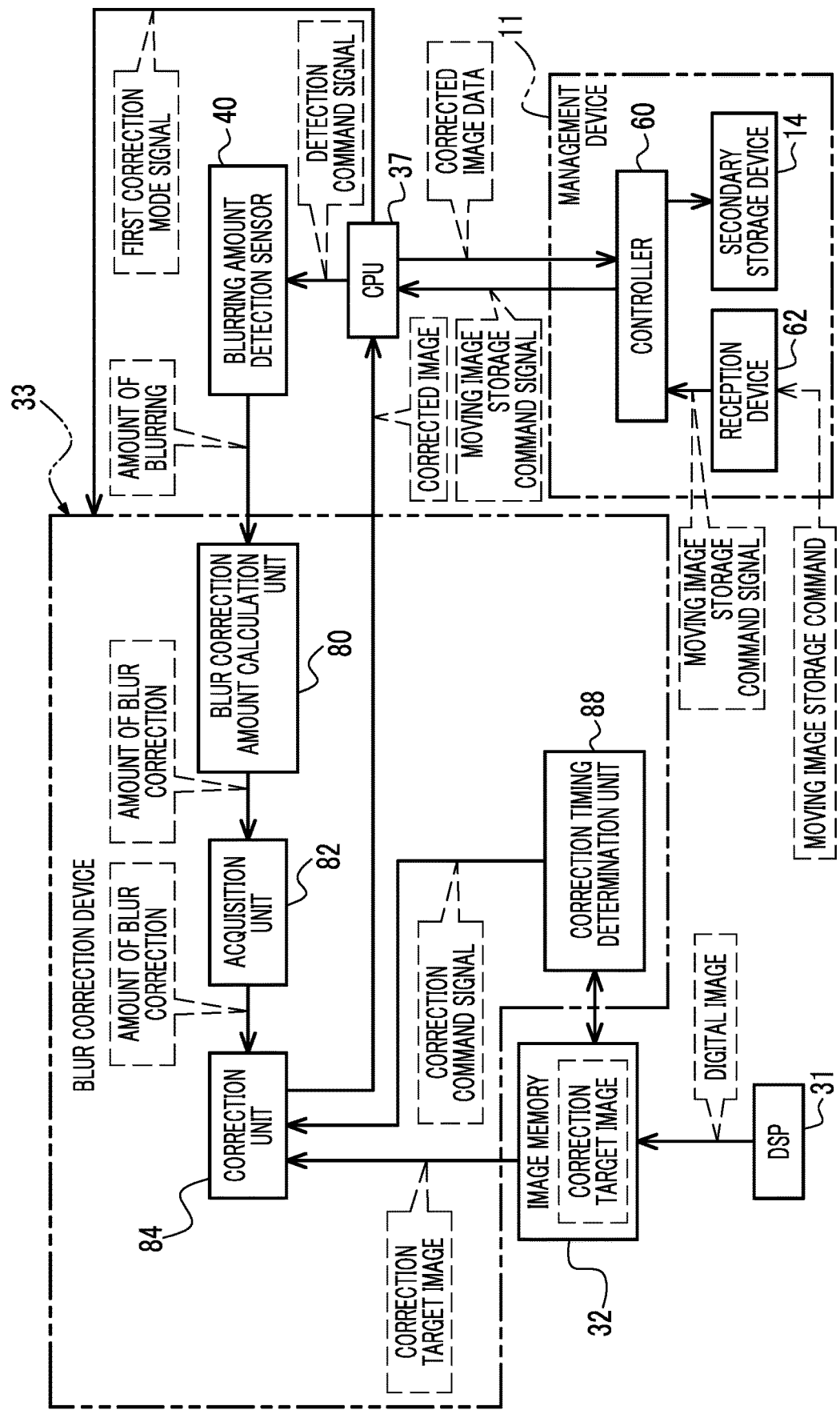
FIG. 10 is a block diagram showing an example of a function of the blur correction device and peripheral devices in a case where the first correction mode is set for the blur correction device included in the surveillance camera according to the second embodiment.
Figure 11:
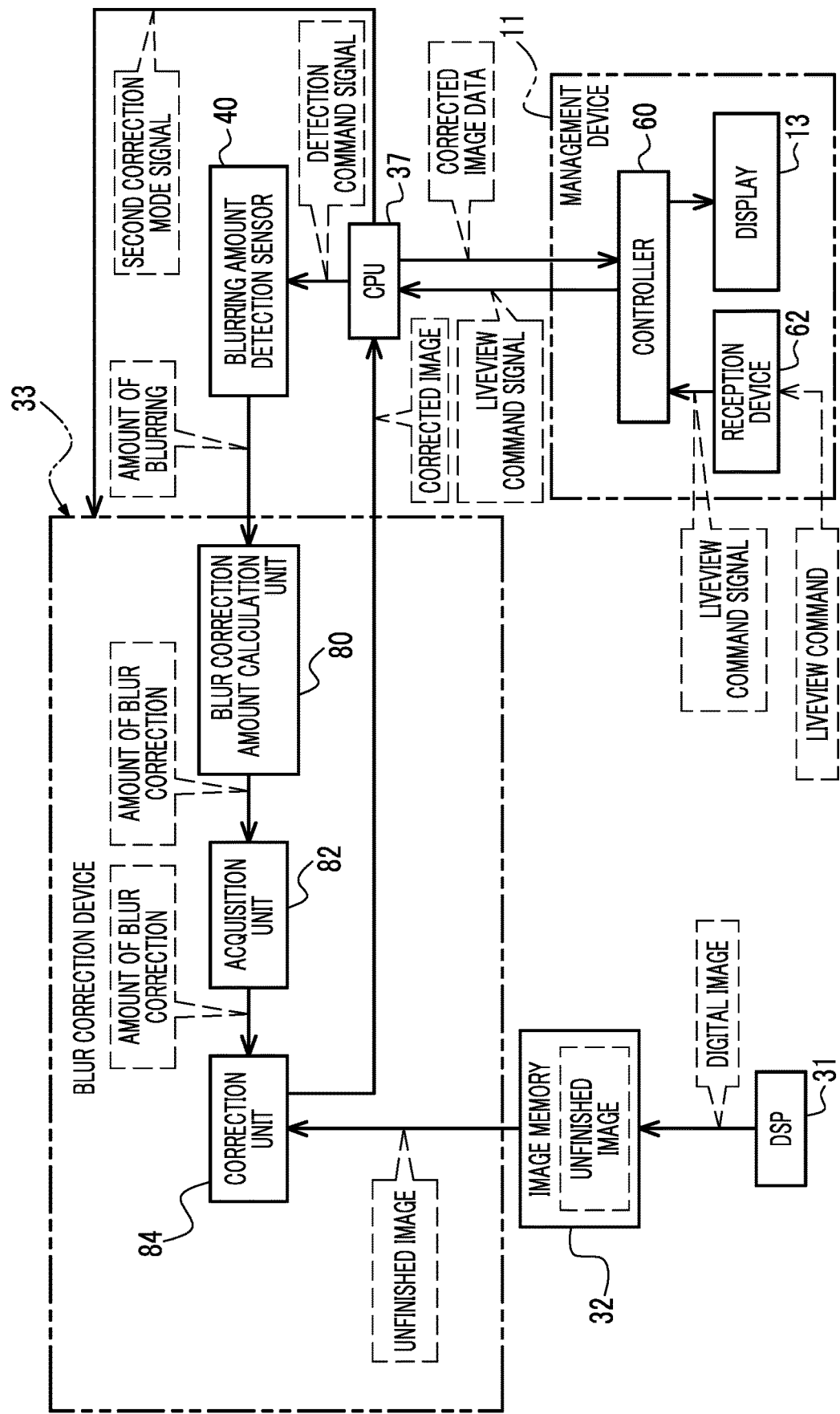
FIG. 11 is a block diagram showing an example of a function of the blur correction device and peripheral devices in a case where a second correction mode is set for the blur correction device included in the surveillance camera according to the second embodiment.

FIG. 10 is a functional block diagram showing an example of the function of the blur correction device 33 in a case where blurring of the image is corrected in the first correction mode. FIG. 11 is a functional block diagram showing an example of the function of the blur correction device 33 in a case where blurring of the image is corrected in the second correction mode.

As an example, as shown in FIG. 10, in the management device 11, in a case where the reception device 62 does not receive the moving image storage command, the reception device 62 outputs the moving image storage command signal to the controller 60. Here, the moving image storage command refers to a command to store the moving image obtained through imaging of the surveillance camera 10 in the secondary storage device 14. The moving image storage command signal refers to a signal indicating a command to store the moving image obtained through imaging of the surveillance camera 10 in the secondary storage device 14.

The controller 60 transmits a moving image storage command signal to the surveillance camera 10. The moving image storage command signal transmitted by the controller 60 is received by the communication I/F 34 (refer to FIG. 2) of the surveillance camera 10, and the moving image storage command signal is output to the CPU 37.

In a case where the moving image storage command signal is input, the CPU 37 outputs a first correction mode signal for giving a command to correct blurring of the image in the first correction mode to the blur correction device 33. The blur correction device 33 operates in the first correction mode in a case where the first correction mode signal is input.

The first correction mode is a correction mode in which the blur correction processing (refer to FIG. 7) described in the first embodiment is executed. That is, in the first correction mode, the correction unit 84 corrects blurring of the correction target image by performing image processing on the correction target image based on the amount of blur correction acquired by the acquisition unit 82 during the exposure necessary to obtain the correction target image.

As an example, as shown in FIG. 11, in the management device 11, in a case where the reception device 62 receives the live view command, the reception device 62 outputs the live view command signal to the controller 60. Here, the live view command refers to a command to display a moving image obtained through imaging of the surveillance camera 10 on the display 13 as a live view image. The live view command signal refers to a signal indicating a command to display a moving image obtained through imaging of the surveillance camera 10 on the display 13 as a live view image.

The controller 60 transmits the live view command signal to the surveillance camera 10. The live view command signal transmitted by the controller 60 is received by the communication I/F 34 (refer to FIG. 2) of the surveillance camera 10, and the live view command signal is output to the CPU 37.

In a case where the live view command signal is input, the CPU 37 outputs a second correction mode signal for giving a command to correct blurring of the image in the second correction mode to the blur correction device 33. The blur correction device 33 operates in the second correction mode in a case where the second correction mode signal is input.

In the second correction mode, the correction unit 84 acquires an unfinished image, which is a digital image less than one frame, from the image memory 32, and corrects blurring of the acquired unfinished image based on the latest amount of blur correction. That is, in the second correction mode, in a case where the digital image is stored in the image memory 32, the correction unit 84 acquires a digital image, which has been stored in advance in the image memory 32, as an unfinished image before the digital image for one frame is stored in the image memory 32. Then, the correction unit 84 corrects blurring of the unfinished image by performing image cutout processing on the unfinished image based on the latest amount of blur correction acquired by the acquisition unit 82.

Next, the operation of the part of the monitoring system 2 relating to the technique of the present disclosure will be described.

First, the flow of the blur correction processing executed by the blur correction device 33 will be described with reference to FIG. 12.

Figure 12:
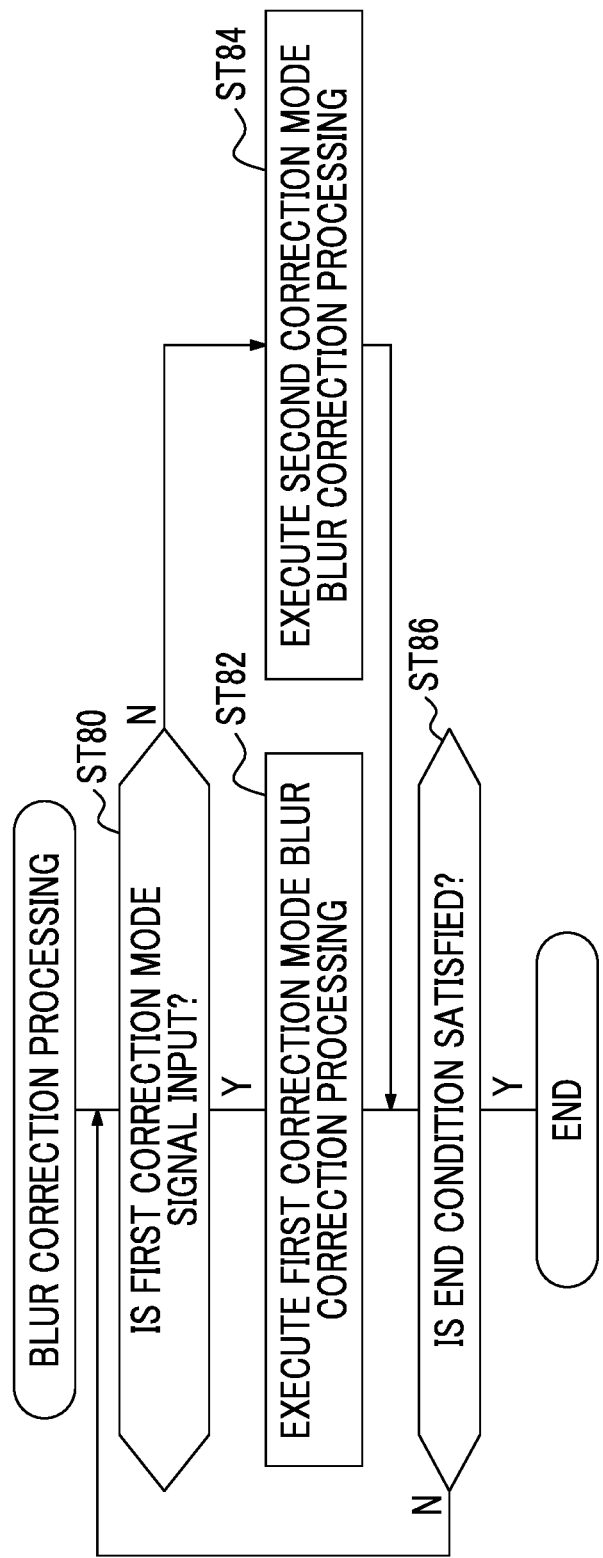
FIG. 12 is a flowchart showing an example of a flow of blur correction processing according to the second embodiment.

In the blur correction processing shown in FIG. 12, first, in step ST80, the blur correction device 33 determines whether or not the first correction mode signal has been input from the CPU 37. In a case where the first correction mode signal is input from the CPU 37 in step ST80, the determination is affirmed, and the blur correction processing proceeds to step ST82. In a case where the second correction mode signal is input from the CPU 73 in step ST80, the determination is denied, and the blur correction processing proceeds to step ST84.

In step ST82, the blur correction device 33 executes the first correction mode blur correction processing, and then the blur correction processing proceeds to step ST86. Here, the first correction mode blur correction processing refers to the blur correction processing (refer to FIG. 7) described in the first embodiment.

In step ST84, the blur correction device 33 executes the second correction mode blur correction processing (refer to FIG. 13) described later, and then the blur correction processing proceeds to step ST86.

In step ST86, the blur correction device 33 determines whether or not the blur correction processing end condition described in the first embodiment is satisfied. In a case where the condition for ending the blur correction processing is not satisfied in step ST86, the determination is denied, and the blur correction processing proceeds to step ST80. In a case where the condition for ending the blur correction processing is satisfied in step ST86, the determination is affirmed, and the blur correction processing ends.

Next, the operation of the part of the monitoring system 2 relating to the technique of the present disclosure will be described. In the second embodiment, a part different from the operation described in the first embodiment will be described.

First, the flow of the second correction mode blur correction processing executed by the blur correction device 33 will be described with reference to FIG. 13.

Figure 13:
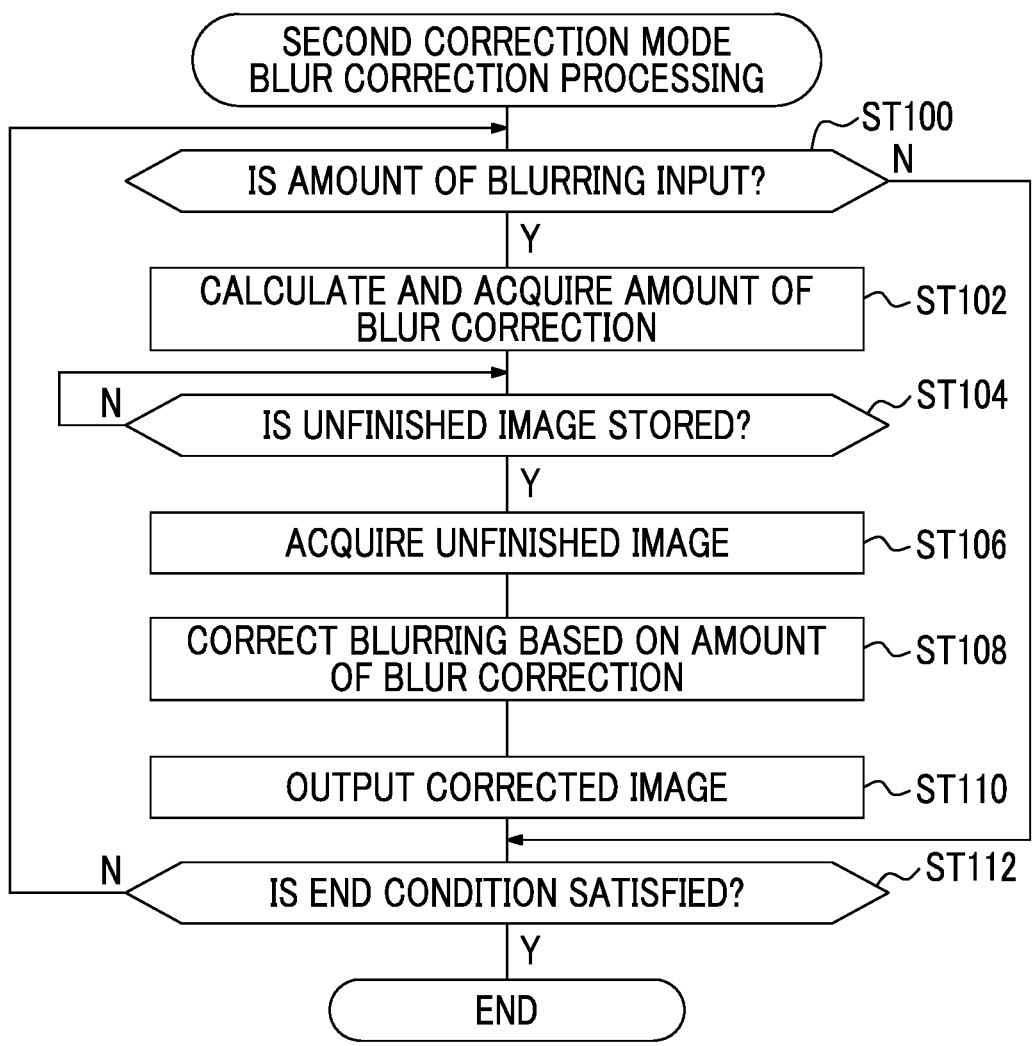
FIG. 13 is a flowchart showing an example of a flow of the second correction mode blur correction processing according to the second embodiment.

In the second correction mode blur correction processing shown in FIG. 13, first, in step ST100, the blur correction amount calculation unit 80 determines whether or not the amount of blurring detected by the blurring amount detection sensor 40 has been input. In a case where the amount of blurring detected by the blurring amount detection sensor 40 is not input in step ST100, the determination is denied, and the second correction mode blur correction amount correction processing proceeds to step ST112. In a case where the amount of blurring detected by the blurring amount detection sensor 40 is input in step ST100, the determination is affirmed, and the second correction mode blur correction processing proceeds to step ST102.

In step ST102, the blur correction amount calculation unit 80 calculates the amount of blur correction based on the input amount of blurring, and outputs the calculated amount of blur correction to the acquisition unit 82. The acquisition unit 82 acquires the amount of blur correction which is output by the blur correction amount calculation unit 80, and then the blur correction processing proceeds to step ST104.

In step ST104, the correction unit 84 determines whether or not an unfinished image is stored in the image memory 32. Here, the case where the unfinished image is not stored in the image memory 32 refers to the case where no digital image is stored in the image memory 32. Further, the case where the unfinished image is stored in the image memory 32 refers to the case where a digital image of less than one frame is stored in the image memory 32.

In a case where the unfinished image is not stored in the image memory 32 in step ST104, the determination is denied, and the determination in step ST104 is performed again. In a case where an unfinished image is stored in the image memory 32 in step ST104, the second correction mode blur correction processing proceeds to step ST106.

In step ST106, the correction unit 84 acquires an unfinished image stored in the image memory 32, and then the second correction mode blur correction processing proceeds to step ST108.

In step ST108, the correction unit 84 corrects blurring of the unfinished image by executing the image cutout processing on the acquired unfinished image based on the amount of blur correction acquired by the acquisition unit 82 in step ST102. Then, the second correction mode blur correction processing proceeds to step ST110.

In step ST110, the correction unit 84 outputs the corrected image obtained by correcting blurring of the unfinished image to the CPU 37, and then the second correction mode blur correction processing proceeds to step ST110. The CPU 37 transmits the corrected image which is input from the correction unit 84 to the management device 11 through the communication I/F 34.

In step ST112, the correction unit 84 determines whether or not the condition for ending the second correction mode blur correction processing (hereinafter, referred to as "second correction mode blur correction processing end condition") is satisfied. Examples of the condition for ending the second correction mode blur correction processing include a condition that the reception device 43 receives a command to end the second correction mode blur correction processing. In a case where the condition for ending the second correction mode blur correction processing is not satisfied in step ST112, the determination is denied, and the second correction mode blur correction processing proceeds to step ST100. In a case where the condition for ending the second correction mode blur correction processing is satisfied in step ST112, the determination is affirmed, and the second correction mode blur correction processing ends.

As described above, in the surveillance camera 10 according to the second embodiment, the correction unit 84 corrects blurring of the image in the first correction mode or the second correction mode. In the first correction mode, the blur correction processing described in the first embodiment is executed, and in the second correction mode, blurring of the unfinished image is corrected based on the latest amount of blur correction. That is, in the first correction mode, blurring of the correction target image is corrected based on the amount of blur correction acquired during the exposure necessary to obtain the correction target image, and in the second correction mode, blurring is corrected for an unfinished image, which is the digital image of less than one frame, based on the latest amount of blur correction. Accordingly, in the first correction mode, it is possible to realize a higher accuracy of blur correction than in the second correction mode, and in the second correction mode, it is possible to realize a higher speed of blur correction than in the first correction mode.

Further, in the surveillance camera 10 according to the second embodiment, in a case where the moving image obtained through imaging is stored in the secondary storage device 14, blurring of the correction target image is corrected in the first correction mode. Accordingly, it is possible to save a moving image with higher accuracy of blur correction as compared with the case of correcting blurring of an unfinished image in the second correction mode.

Further, in the surveillance camera 10 according to the second embodiment, in a case where the moving image obtained through imaging is displayed on the display 13 as a live view image, blurring of the unfinished image is corrected in the second correction mode. In the first correction mode, it is necessary to wait for the correction target image, which is a digital image for one frame, to be stored in the image memory 32. In contrast, in the second correction mode, it is not necessary to wait for the correction target image to be stored in the image memory 32. That is, in the second correction mode, blur correction is performed on an unfinished image that is a digital image less than one frame in a step before the digital image for one frame is stored in the image memory 32. Therefore, a moving image which is highly close to a real-time image can be displayed on the display 13 as compared with the case where the corrected image obtained by correcting blurring of the correction target image is displayed on the display 13 after waiting for the correction target image to be stored in the image memory 32.

Figure 14:
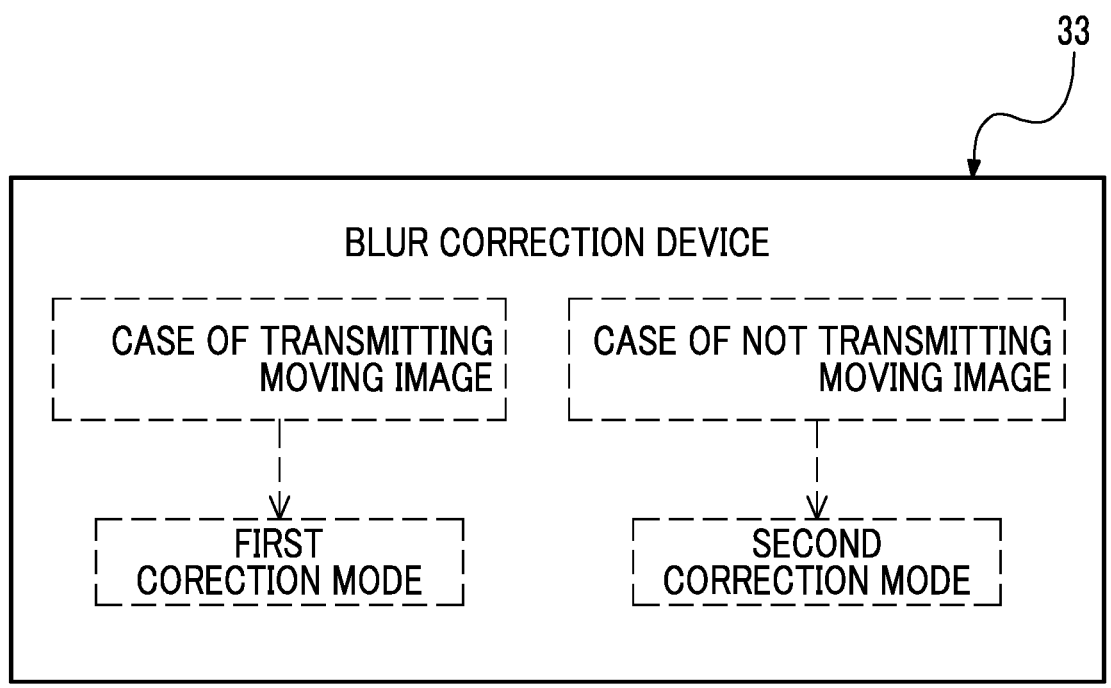
FIG. 14 is a conceptual diagram showing a modification example of the relationship between the correction mode, which is set for the blur correction device included in the surveillance camera according to the second embodiment, and the condition for setting the correction mode.

In the description of the second embodiment, the first correction mode is set in a case where the moving image is stored in the secondary storage device 14, and the second correction mode is set in a case where the moving image is displayed on the display 13. However, the techniques of the present disclosure are not limited thereto. In a case where information is exchanged between the surveillance camera 10 and the management device 11, there is a time lag between the transmission of the information and the reception of the information. In a case where a time lag occurs, it is possible to ensure a time to correct the blurring in the first correction mode, which requires more time to correct the blurring than in the second correction mode. Therefore, as shown in FIG. 14, as an example, in a case where a moving image is transmitted from the surveillance camera 10 to the management device 11, the first correction mode is set for the blur correction device 33. Further, in a case where the moving image is not transmitted from the surveillance camera 10 to the management device 11, the second correction mode is set for the blur correction device 33.

Figure 15:
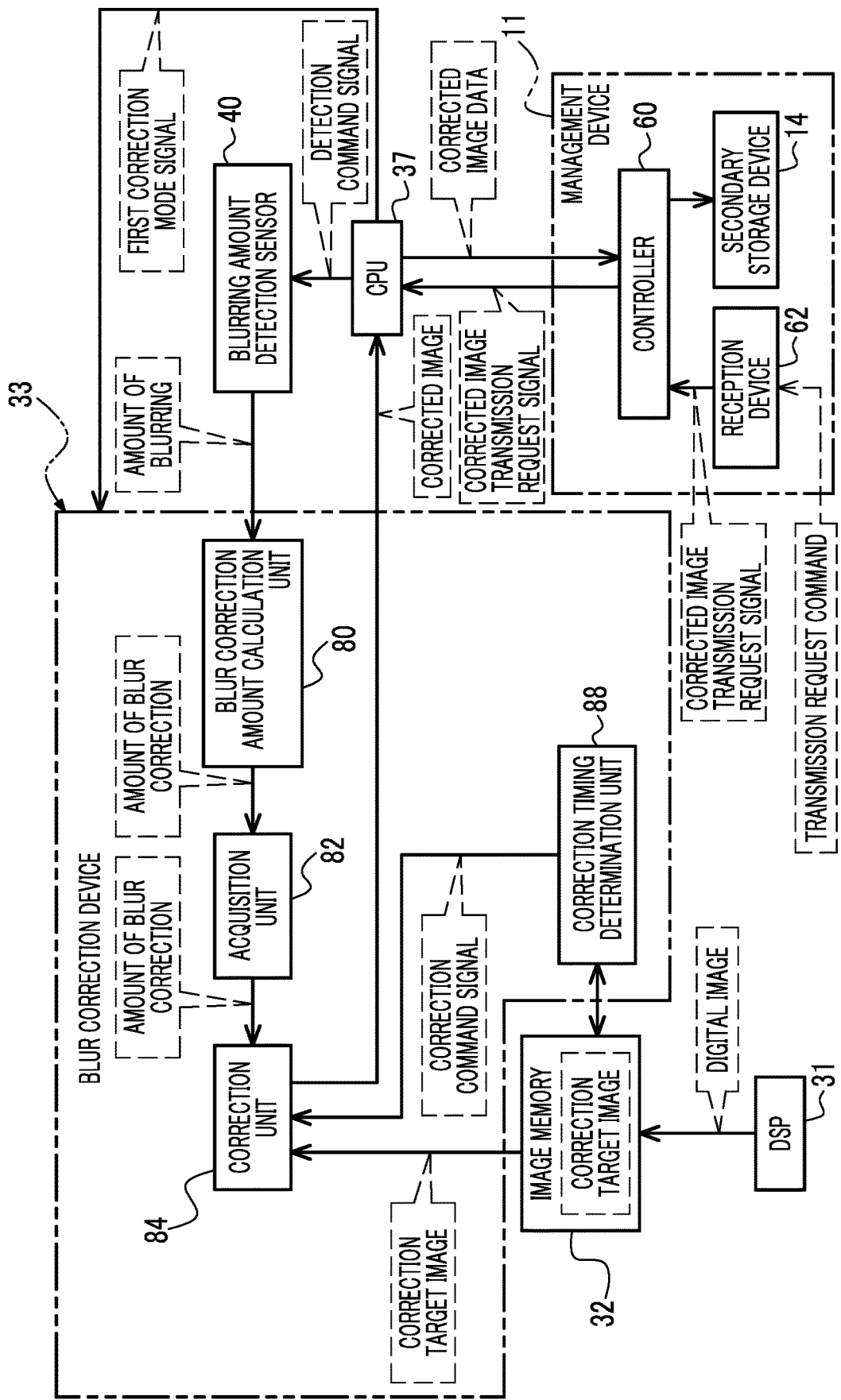
FIG. 15 is a block diagram showing a modification example of a function of the blur correction device and peripheral devices in a case where the first correction mode is set for the blur correction device included in the surveillance camera according to the second embodiment.

In such a case, the blur correction device 33 operates in the second correction mode in the default state. As shown in FIG. 15 as an example, in a case where the first correction mode signal is input from the CPU 37 to the blur correction device 33, the second correction mode shifts to the first correction mode.

As an example, as shown in FIG. 15, in the management device 11, in a case where the reception device 62 receives the transmission request command, the reception device 62 outputs the corrected image transmission request signal to the controller 60. Here, the transmission request command refers to a command to request the surveillance camera 10 to transmit a corrected image. The corrected image transmission request signal refers to a signal indicating a command to request the surveillance camera 10 to transmit the corrected image.

The controller 60 transmits the corrected image transmission request command signal to the surveillance camera 10. The corrected image transmission command signal transmitted by the controller 60 is received by the communication I/F 34 (refer to FIG. 2) of the surveillance camera 10, and the corrected image transmission command signal is output to the CPU 37.

In a case where the corrected image transmission request command signal is input, the CPU 37 outputs the first correction mode signal to the blur correction device 33. The blur correction device 33 operates in the first correction mode in a case where the first correction mode signal is input.

In such a manner, in a case where the moving image is transmitted from the surveillance camera 10 to the management device 11, the correction unit 84 corrects the blurring in the first correction mode. In such a case, by using the time lag required for transmitting the moving image from the surveillance camera 10 to the management device 11, it is possible to ensure the time for blur correction in the first correction mode, which requires more time for blur correction than in the second correction mode. Therefore, it is possible to transmit a moving image with high accuracy of blur correction from the surveillance camera 10 to the management device 11 as compared with the case of correcting blurring of the unfinished image in the second correction mode.

Third Embodiment

In the second embodiment, the case where the first correction mode or the second correction mode is set regardless of the length of the exposure period has been described. However, in the third embodiment, a case where the first correction mode and the second correction mode are selectively set in accordance with the length of the exposure period will be described. In the third embodiment, the same components as those in the first and second embodiments are represented by the same reference numerals, and the description thereof will not be repeated. Hereinafter, the parts different from the first and second embodiments will be described.

Figure 16:
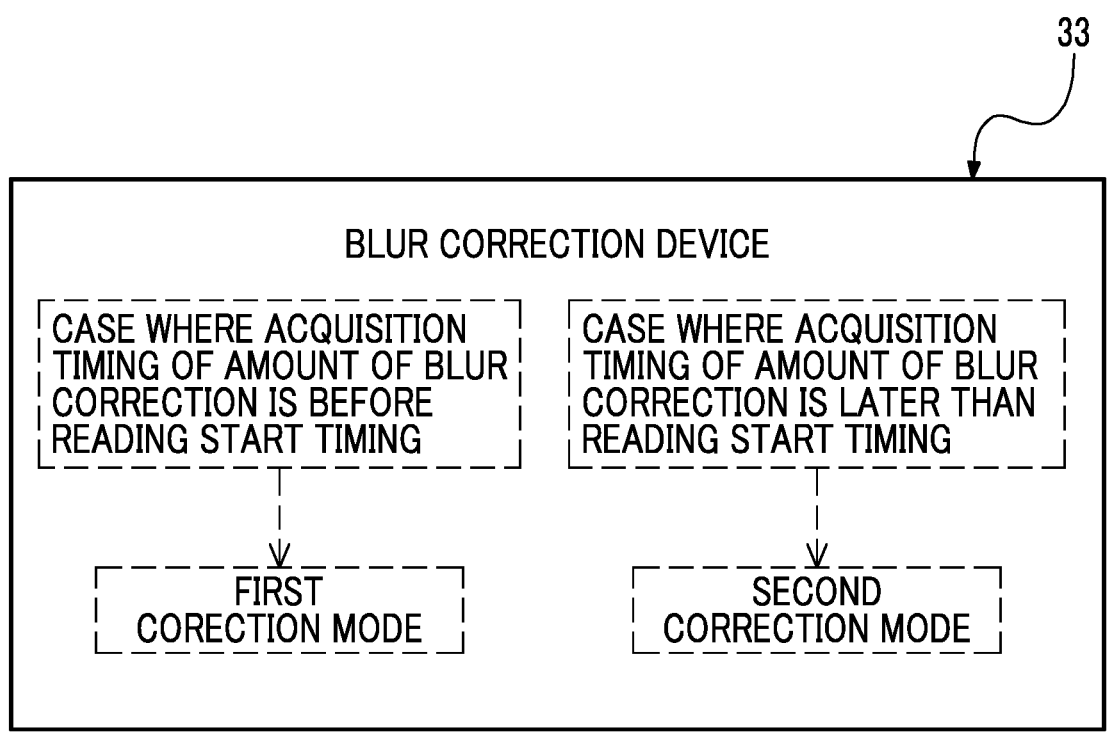
FIG. 16 is a conceptual diagram showing an example of the relationship between a correction mode, which is set for a blur correction device included in a surveillance camera according to a third embodiment, and a condition for setting the correction mode.

The correction unit 84 included in the blur correction device 33 according to the third embodiment corrects blurring in a correction mode of the first correction mode and the second correction mode. The correction mode is determined in accordance with the reading start timing and the acquisition timing of the amount of blur correction acquired by the acquisition unit 82 described in the first embodiment. Specifically, as shown in FIG. 16, in a case where the acquisition timing of the amount of blur correction acquired by the acquisition unit 82 is before the reading start timing in the imaging for one frame performed by the imaging element 25, the correction unit 84 corrects the blurring in the first correction mode. Further, in the imaging for one frame performed by the imaging element 25, in a case where the acquisition timing of the amount of blur correction acquired by the acquisition unit 82 is later than the reading start timing, the blurring is corrected in the second correction mode.

Figure 17:
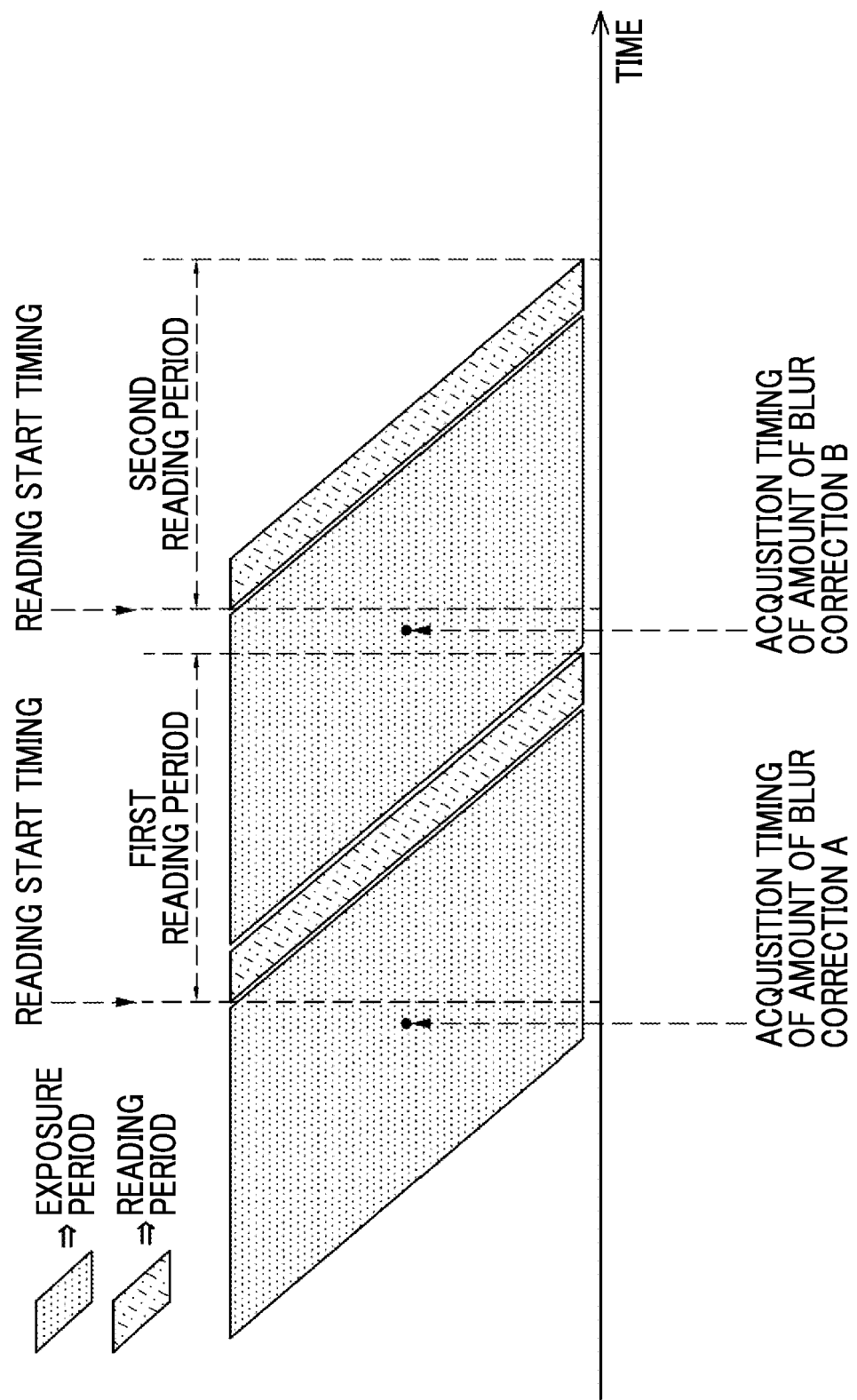
FIG. 17 is a time chart showing an example of an exposure period and a reading period of each of the first and second frames included in the moving image obtained through imaging of the surveillance camera according to the third embodiment.

FIG. 17 shows an example of the exposure period and the reading period of the first and second frames in a case where the exposure period of each frame is longer than the exposure period in the example shown in FIG. 6A. In the example shown in FIG. 17, an exposure period is set to be longer than the exposure period in the example shown in FIG. 6A since the shutter speed of each frame is set to be slower than the shutter speed of each frame in a case where the imaging in the example shown in FIG. 6A is performed.

In the example shown in FIG. 17, in the first frame included in the moving image, the acquisition timing of the amount of blur correction A acquired by the acquisition unit 82 is earlier than the reading start timing. That is, the acquisition unit 82 acquires the amount of blur correction A earlier than the reading start timing during the exposure of the first frame. In such a case, the correction target image in the first frame is corrected for blurring by performing image cutout processing based on the amount of blur correction A. In the example shown in FIG. 17, the reading start timing of the first frame is an example of the "start point of reading an image from the imaging element" relating to the technique of the present disclosure.

In the example shown in FIG. 17, in the imaging for a moving image, the first reading period is set for the imaging of the first frame of the first and second frames which are adjacent, and the second reading period is set for the imaging of the second frame. The first reading period is a period in which the analog image of the first frame is read from the imaging element 25. The second reading period is a period in which the analog image of the second frame is read from the imaging element 25.

In the example shown in FIG. 17, the first reading period and the second reading period do not overlap. Then, the acquisition unit 82 acquires the amount of blur correction B during the exposure between the first reading period and the second reading period. In such a case, blur correction is performed on the correction target image in the second frame by performing image cutout processing based on the amount of blur correction B acquired by the acquisition unit 82. The "first frame" described herein is an example of the "previous frame" relating to the technique of the present disclosure, and the "second frame" described herein is an example of the "subsequent frame" relating to the technique of the present disclosure. Further, here, the relationship between the first and second frames is illustrated, but this is only an example, and the technique of the present disclosure is not limited to this. That is, the previous and subsequent frames which are adjacent after the second frame included in the moving image obtained through imaging also have the same relationship as the first and second frames of the example shown in FIG. 17.

Figure 18:
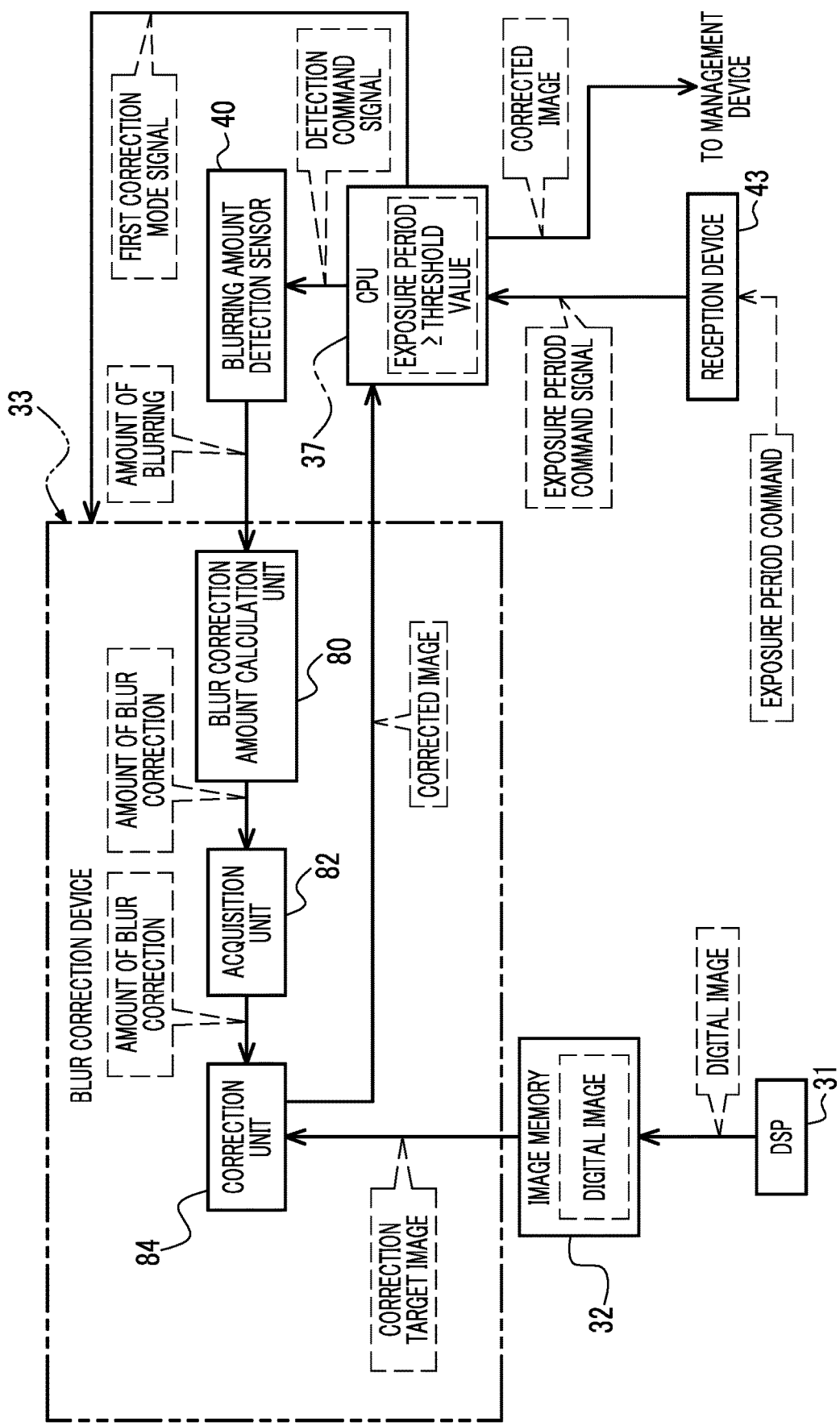
FIG. 18 is a block diagram showing an example of a function of the blur correction device and peripheral devices in a case where the first correction mode is set for the blur correction device included in the surveillance camera according to the third embodiment.
Figure 19:
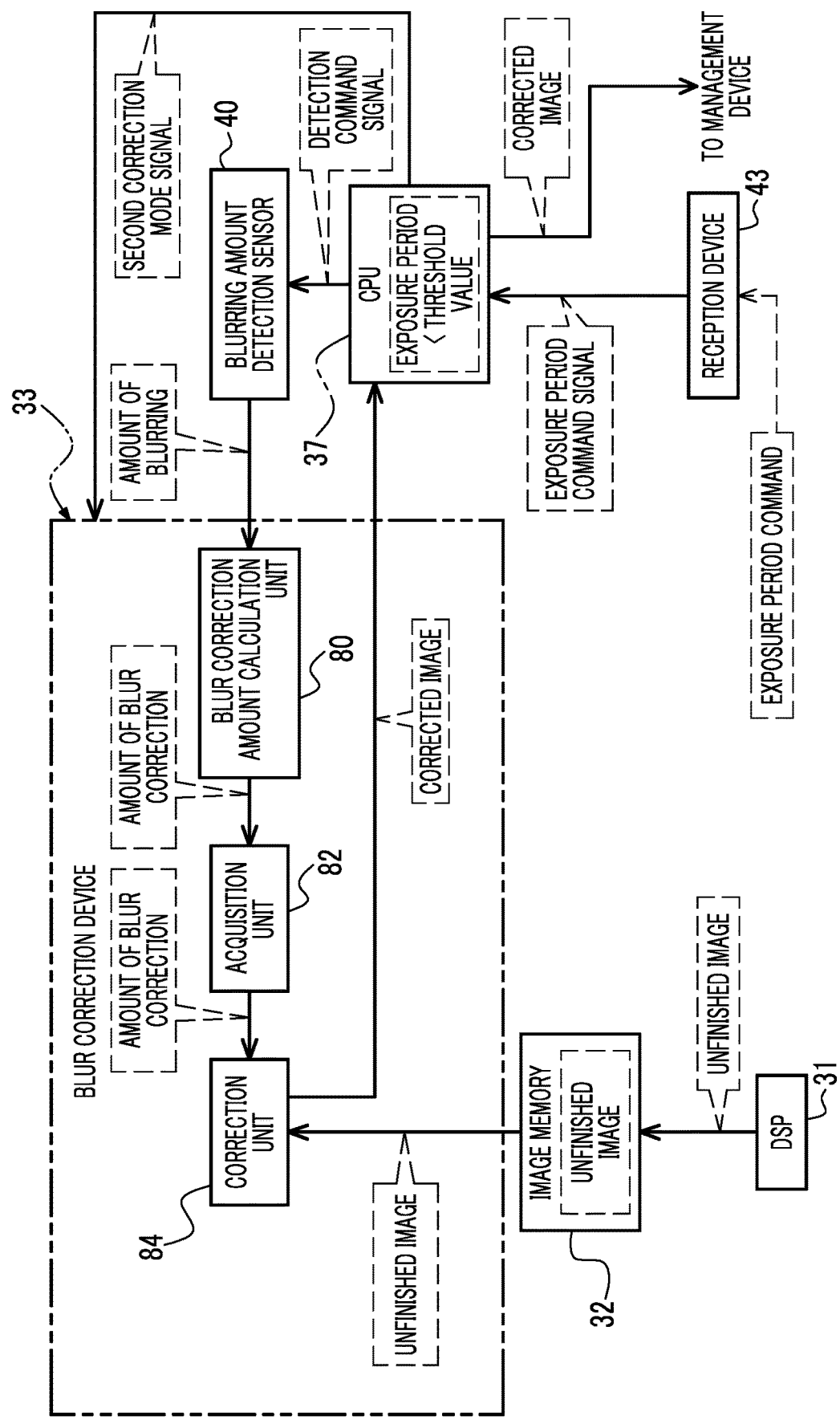
FIG. 19 is a block diagram showing an example of a function of the blur correction device and peripheral devices in a case where a second correction mode is set for the blur correction device included in the surveillance camera according to the third embodiment.

FIG. 18 shows an example of the function of the blur correction device 33 in a case where blurring of the image is corrected in the first correction mode. FIG. 19 shows an example of the function of the blur correction device 33 in a case where blurring of the image is corrected in the second correction mode.

The blur correction device 33 shown in FIG. 18 is different from the blur correction device 33 shown in FIG. 10 in that the correction timing determination unit 88 is not provided. In the first correction mode, the correction unit 84 acquires a digital image from the image memory 32 even in a case where the correction command signal is not input. Specifically, in the first correction mode, the correction unit 84 acquires a digital image stored in advance in the image memory 32 with the acquisition of the amount of blur correction acquired by the acquisition unit 82 as a trigger, and performs blur correction on the acquired digital image based on the amount of blur correction.

That is, even in a case where the digital image in the image memory 32 is an unfinished image, the correction unit 84 acquires the digital image from the image memory 32 with the acquisition of the amount of blur correction acquired by the acquisition unit 82 as a trigger, and performs blur correction on the acquired digital image. The blur correction for the digital image for one frame which is set as a blur correction target in the current frame is completed until the acquisition unit 82 acquires the amount of blur correction during the exposure of the next frame.

As an example, as shown in FIG. 18, in a case where the reception device 43 receives the exposure period command, the reception device 43 outputs the exposure period command signal to the controller 60. Here, the exposure period command refers to a command of the exposure period for one frame. The exposure period command signal refers to a signal indicating the command of the exposure period for one frame.

The controller 60 transmits an exposure period command signal to the surveillance camera 10. The exposure period command signal transmitted by the controller 60 is received by the communication I/F 34 (refer to FIG. 2) of the surveillance camera 10, and the exposure period command signal is output to the CPU 37.

In a case where the exposure period command signal is input, the CPU 37 determines whether or the exposure period indicated by the exposure period command signal is equal to or greater than a threshold value. The threshold value is a value predetermined as an exposure period that satisfies the default conditions by a test using an actual machine and/or a computer simulation or the like. The default condition refers to a condition that the acquisition timing of the amount of blur correction acquired by the acquisition unit 82 is earlier than the reading start timing in each frame and the previous frame reading period and the subsequent frame reading period do not overlap. Here, the previous frame reading period refers to the reading period of the analog image of the previous frame of the previous and subsequent frames which are adjacent. The subsequent frame reading period refers to the reading period of the analog image of the subsequent frame of the previous and subsequent frames which are adjacent.

The CPU 37 outputs the first correction mode signal to the blur correction device 33 in a case where the exposure period which is indicated by the exposure period command signal is equal to or greater than the threshold value. The blur correction device 33 operates in the first correction mode in a case where the first correction mode signal is input from the CPU 37. In the third embodiment, in a case where the first correction mode is set for the blur correction device 33, the correction unit 84 acquires a digital image stored in advance in the image memory 32, and corrects blurring on the acquired digital image based on the amount of blur correction currently acquired by the acquisition unit 82. Blur correction based on the same amount of blur correction is performed on the digital image for one frame. As a result, this configuration has the same technical significance as the blur correction is performed on the correction target images described in the first and second embodiments.

As an example, as shown in FIG. 19, the CPU 37 outputs a second correction mode signal to the blur correction device 33 in a case where the exposure period indicated by the exposure period command signal is less than the threshold value. In a case where the second correction mode signal is input from the CPU 37, the blur correction device 33 operates in the second correction mode described in the second embodiment.

Next, the operation of the part of the monitoring system 2 relating to the technique of the present disclosure will be described. In the third embodiment, a part different from the operation described in the second embodiment will be described.

Figure 20:
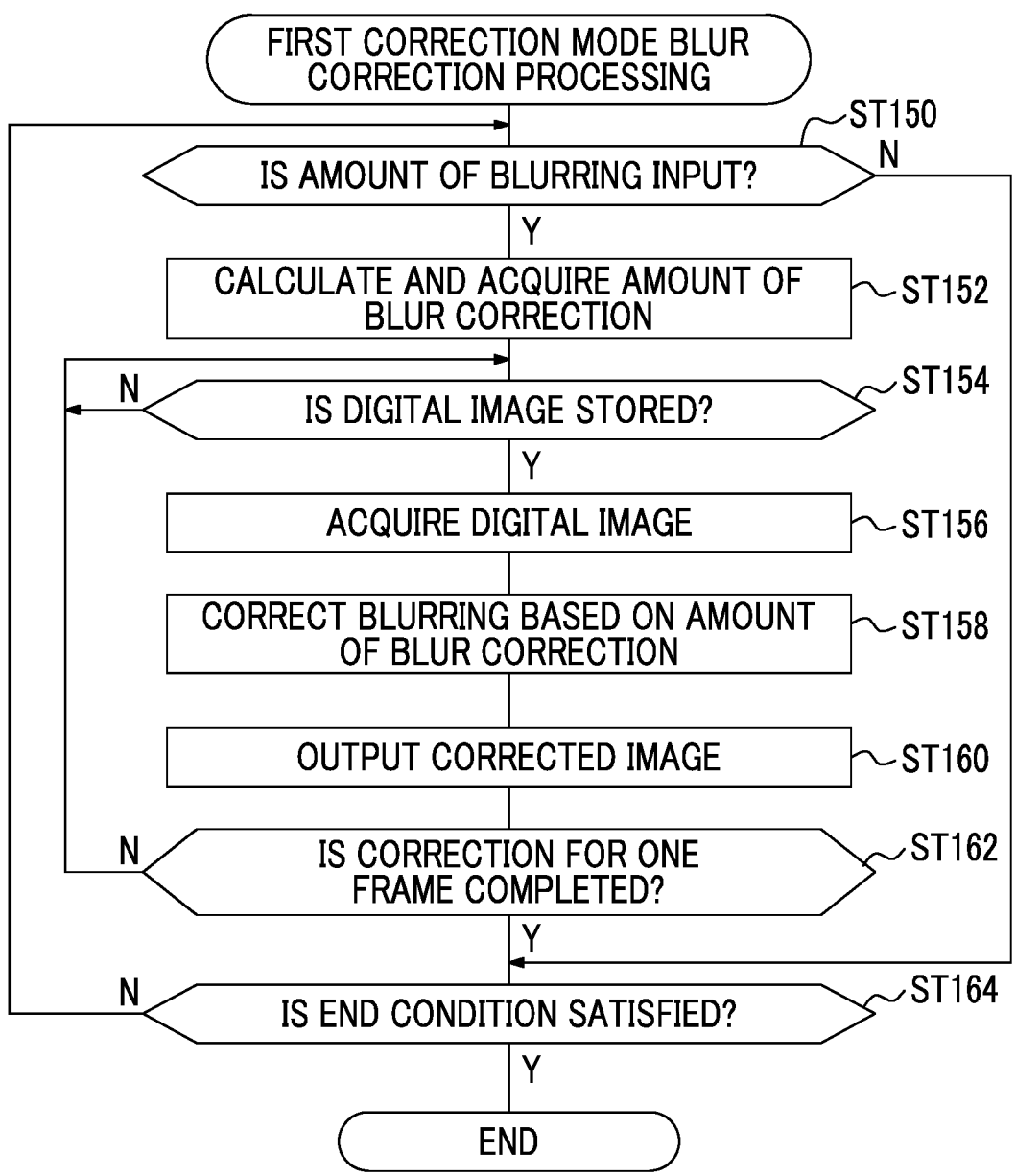
FIG. 20 is a flowchart showing an example of a flow of blur correction processing according to the third embodiment.

FIG. 20 shows an example of the flow of the first correction mode blur correction processing executed by the blur correction device 33.

In the first correction mode blur correction processing shown in FIG. 20, first, in step ST150, the blur correction amount calculation unit 80 determines whether or not the amount of blurring detected by the blurring amount detection sensor 40 has been input. In a case where the amount of blurring detected by the blurring amount detection sensor 40 is not input in step ST150, the determination is denied, and the first correction mode blur correction amount correction processing proceeds to step ST164. In a case where the amount of blurring detected by the blurring amount detection sensor 40 is input in step ST150, the determination is affirmed, and the first correction mode blur correction processing proceeds to step ST152.

In step ST152, the blur correction amount calculation unit 80 calculates the amount of blur correction based on the input amount of blurring, and outputs the calculated amount of blur correction to the acquisition unit 82. The acquisition unit 82 acquires the amount of blur correction which is output by the blur correction amount calculation unit 80, and then the first correction mode blur correction processing proceeds to step ST154.

In step ST154, the correction unit 84 determines whether or not the digital image is stored in the image memory 32. In a case where the digital image is not stored in the image memory 32 in step ST154, the determination is denied, and the determination in step ST154 is performed again. Here, the case where the digital image is not stored in the image memory 32 refers to, for example, the case where no digital image is stored in the image memory 32. In a case where the digital image is stored in the image memory 32 in step ST154, the determination is affirmed, and the first correction mode blur correction processing proceeds to step ST156.

In step ST156, the correction unit 84 acquires the digital image stored in the image memory 32, and then the first correction mode blur correction processing proceeds to step ST158.

In step ST158, the correction unit 84 corrects blurring of the digital image by executing image cutout processing on the digital image acquired in step ST156 based on the amount of blur correction acquired by the acquisition unit 82 in step ST152. Then, the first correction mode blur correction processing proceeds to step ST160.

In step ST160, the correction unit 84 outputs the corrected image obtained by correcting blurring of the digital image to the CPU 37, and then the first correction mode blur correction processing proceeds to step ST162. The CPU 37 transmits the corrected image which is input from the correction unit 84 to the management device 11 through the communication I/F 34.

In step ST162, the correction unit 84 determines whether or not the processing of step ST158 is completed for the digital image for one frame. In a case where the processing of step ST158 is not completed for the digital image for one frame in step ST162, the determination is denied, and the first correction mode blur correction processing proceeds to step ST154. In a case where the processing of step ST158 is completed for the digital image for one frame in step ST162, the determination is affirmed, and the first correction mode blur correction processing proceeds to step ST164.

In step ST164, the correction unit 84 determines whether or not the condition for ending the first correction mode blur correction processing (hereinafter, referred to as "first correction mode blur correction processing end condition") is satisfied. Examples of the condition for ending the first correction mode blur correction processing include a condition that the reception device 43 has received a command to end the first correction mode blur correction processing. In a case where the condition for ending the first correction mode blur correction processing is not satisfied in step ST164, the determination is denied, and the first correction mode blur correction processing proceeds to step ST150. In a case where the condition for ending the first correction mode blur correction processing is satisfied in step ST152, the determination is affirmed, and the first correction mode blur correction processing ends.

As described above, in the surveillance camera 10 according to the third embodiment, the acquisition unit 82 acquires the amount of blur correction earlier than the start point of reading the analog image from the imaging element 25 during the exposure of the first frame. Therefore, it is possible to perform blur correction on the correction target image, which is a digital image for one frame corresponding to the analog image for one frame which is read in the first frame, based on the amount of blur correction acquired during the exposure period of the first frame.

Further, in the surveillance camera 10 according to the third embodiment, in a case where the first reading period and the second reading period do not overlap, blur correction is performed on the digital image for one frame in the second frame, based on the amount of blur correction acquired during the exposure between the first reading period and the second reading period. As a result, blurring of the digital image for one frame in the second frame is not affected by the amount of blur correction acquired in the first frame, and is corrected based on the amount of blur correction acquired during the exposure of the second frame. Blurring of the digital image in and after the third frame is also corrected by the same method. Therefore, it is possible to prevent the amount of blur correction acquired during the exposure of the previous frame from affecting the blur correction for the digital image of the subsequent frame of the previous and subsequent frames which are adjacent.

Further, in the surveillance camera 10 according to the third embodiment, blurring is corrected in a correction mode, which is determined in accordance with the reading start timing and the acquisition timing of the amount of blur correction acquired by the acquisition unit 82, in the first correction mode and the second correction mode. Accordingly, it is possible to correct the blurring in an appropriate correction mode as compared with the case where the blurring is corrected in a correction mode, which is determined regardless of the reading start timing and the acquisition timing of the amount of blur correction acquired by the acquisition unit 82, in the first correction mode and the second correction mode.

Further, in the surveillance camera 10 according to the third embodiment, in a case where the acquisition timing of the amount of blur correction acquired by the acquisition unit 82 is before the reading start timing, the blurring is corrected in the first correction mode. Further, in a case where the acquisition timing of the amount of blur correction acquired by the acquisition unit 82 is later than the reading start timing, the blurring is corrected in the second correction mode. Accordingly, it is possible to correct the blurring in an appropriate correction mode as compared with the case where the blurring is corrected in a correction mode, which is determined regardless of the relationship between the reading start timing and the acquisition timing of the amount of blur correction acquired by the acquisition unit 82, in the first correction mode and the second correction mode.

Figure 21:
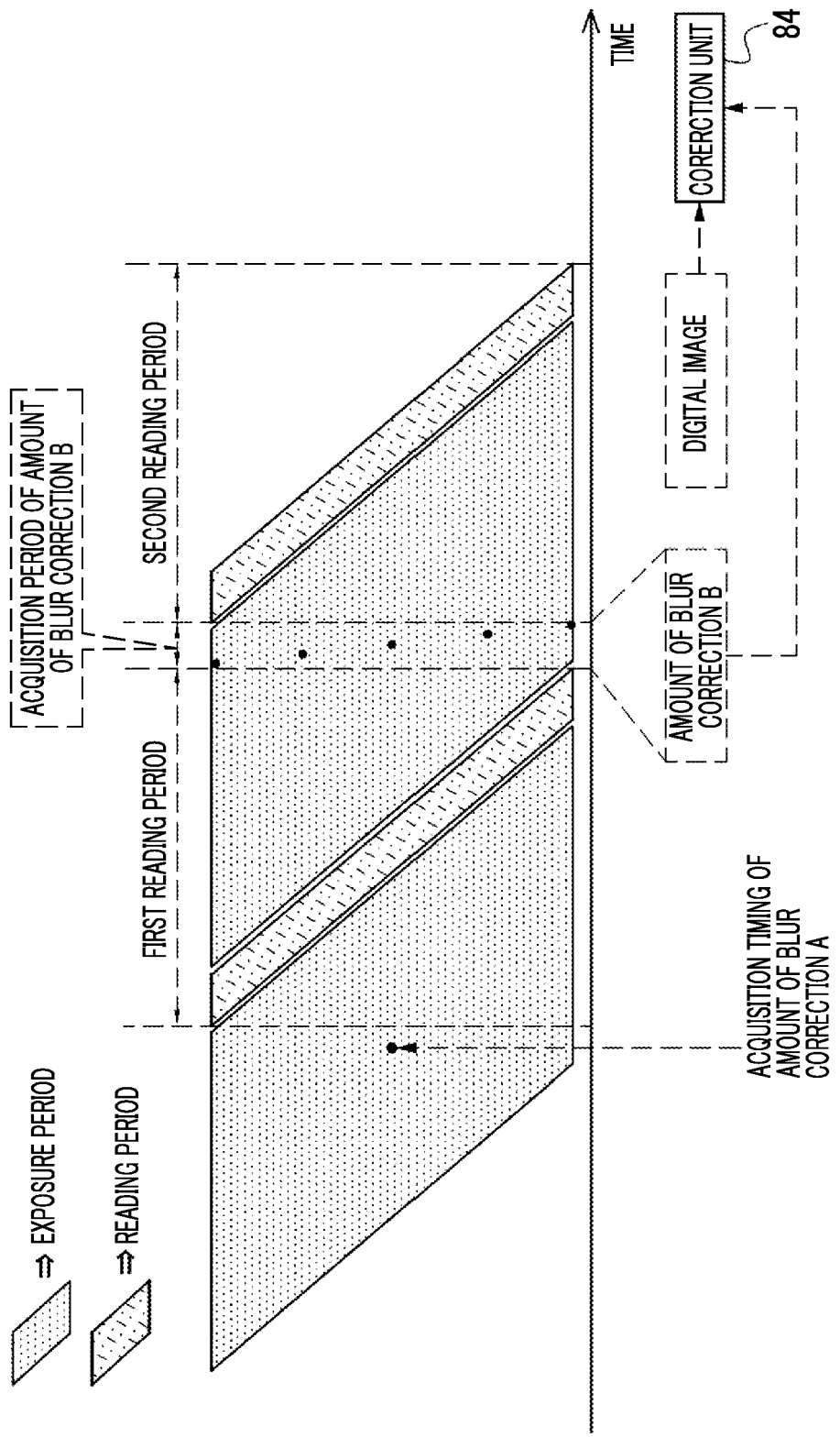
FIG. 21 is a conceptual diagram showing an example of an aspect in which blurring in a digital image is corrected based on an amount of blur correction acquired throughout the entire exposure period for one frame between the first reading period and the second reading period.

In the description of the third embodiment, blurring of the digital image in the second frame is corrected based on the amount of blur correction B acquired at the center point of the exposure period between the first reading period and the second reading period. However, the technique of the present disclosure is not limited to this. For example, as shown in FIG. 21, blurring may be corrected by performing image cutout processing on the digital image in the second frame, based on a plurality of amounts of blur correction B acquired by the acquisition unit 82 throughout the entire exposure period for one frame between the first reading period and the second reading period. As a configuration example in which a plurality of amounts of blur correction B are used, there is a configuration example in which blurring is corrected by performing image cutout processing on the digital image in the second frame based on an average value of a plurality of amounts of blur correction B (five amounts of blur correction B in the example shown in FIG. 21). It is possible to correct the blurring in the same method for the digital image in and after the third frame. By correcting the blurring in such a manner, it is possible to improve the accuracy of blur correction as compared with the case where the blurring is corrected based on only one amount of blur correction.

Further, in the configuration example described in the third embodiment, the exposure period in which the first reading period and the second reading period do not overlap is set by adjusting the shutter speed. However, the technique of the present disclosure is not limited to this. For example, in addition to adjusting the shutter speed, the CPU 37 may control the reset timing of each photosensitive pixel in the imaging region of the imaging element 25 and the input timing of the vertical synchronization signal to the imaging element 25. In such a manner, the exposure period that satisfies the above-mentioned default condition may be set. By controlling in such a manner, for example, it is possible to prevent the reading period of the previous frame of the previous and subsequent frames which are adjacent from overlapping with the exposure period of the subsequent frame. As a result, as compared with the example shown in FIG. 21, the end point of the reading period of the previous frame and the acquisition timing of the amount of blur correction during the exposure period of the subsequent frame are separated from each other. Therefore, as compared with the example shown in FIG. 21, the blur correction of the previous frame (for example, the first frame) can be performed with a margin. Further, as compared with the example shown in FIG. 21, blurring of the subsequent frame (for example, the second frame) can be corrected with a margin.

Further, in each of the above embodiments, a device including an ASIC is illustrated as the blur correction device 33, but the technique of the present disclosure is not limited to this. For example, the blur correction device 33 may be realized by a software configuration by a computer.

Figure 22:
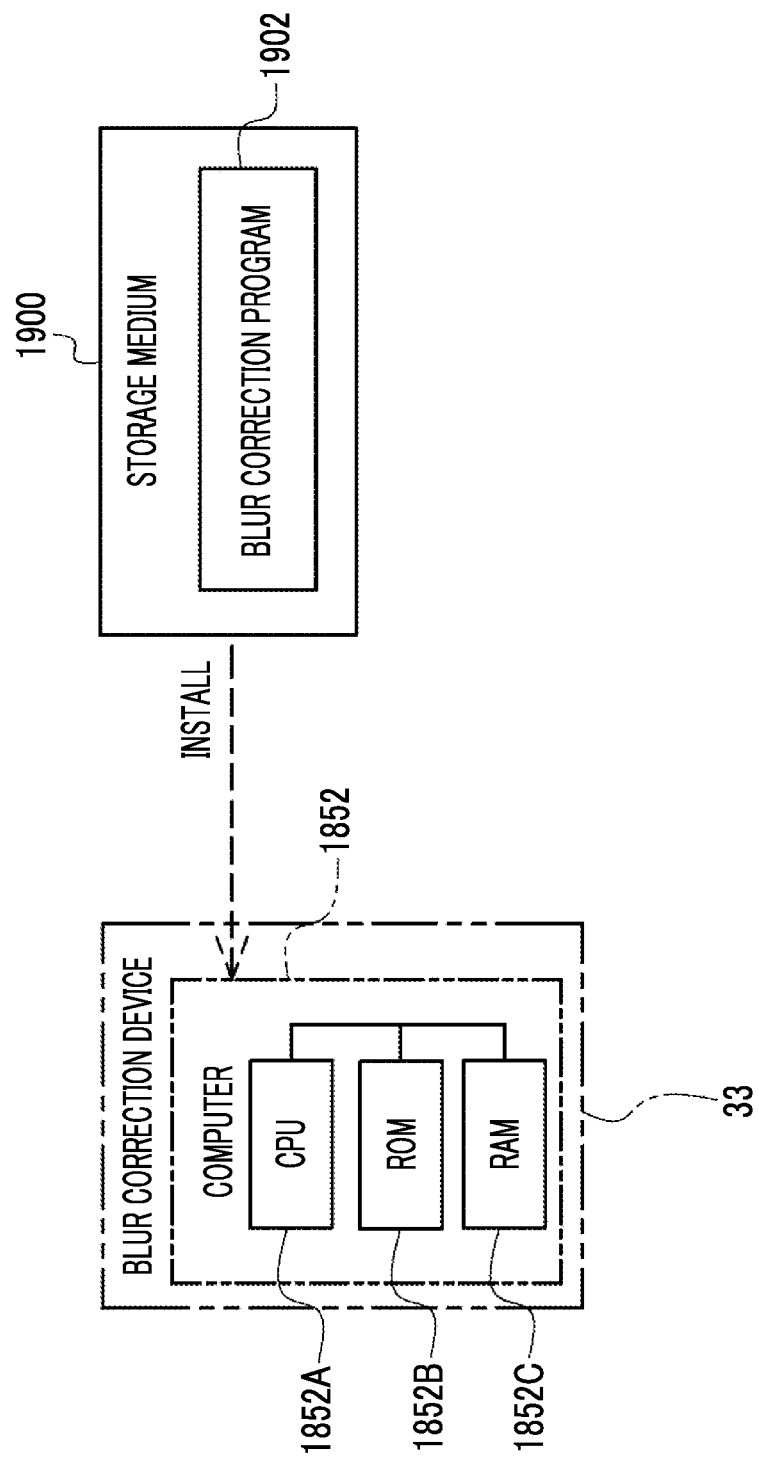
FIG. 22 is a conceptual diagram showing an example of an aspect in which a blur correction program is installed in a computer in a blur correction device from a storage medium in which a blur correction program is stored.
Figure 23:
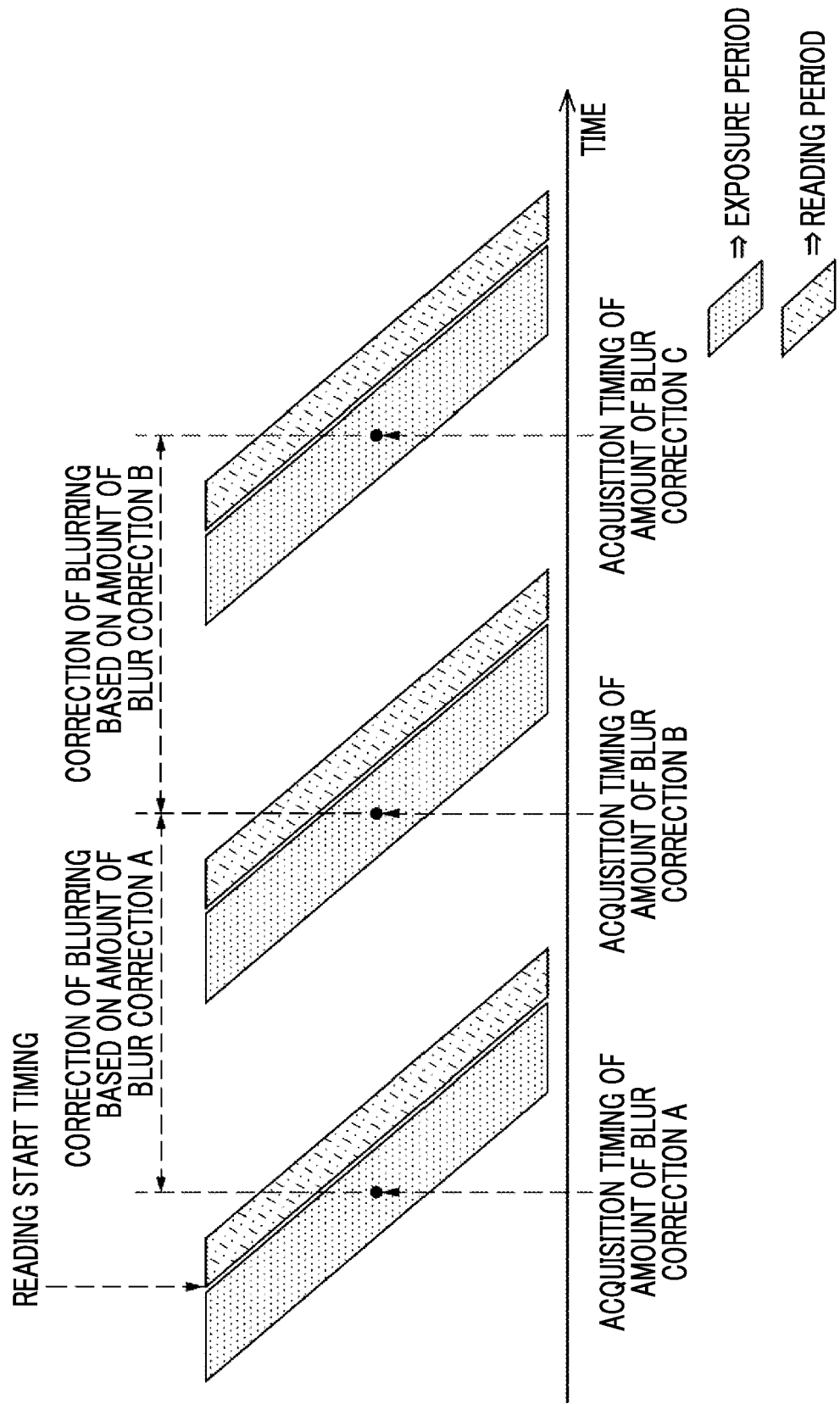
FIG. 23 is a time chart showing an example of an aspect in which a blur correction device in the related art corrects blurring of a moving image.

In such a case, for example, as shown in FIG. 22, the blur correction device 33 includes a computer 1852. Then, the blur correction program 1902 for causing the computer 1852 to execute the blur correction processing described above is stored in the storage medium 1900. The computer 1852 includes a CPU 1852A, a ROM 1852B, and a RAM 1852C. The blur correction program 1902 stored in the storage medium 1900 is installed in the computer 1852, and the CPU 1852A executes the blur correction processing described above in accordance with the blur correction program 1902.

In the example shown in FIG. 22, the CPU 1852A is a single CPU, but the technique of the present disclosure is not limited to this, and a plurality of CPUs may be employed.

Examples of the storage medium 1900 include an optional portable storage medium such as an SSD or a USB memory.

Further, the blur correction program 1902 may be stored in a storage unit of another computer or server device connected to the computer 1852 through a communication network (not shown), and the blur correction program 1902 may be downloaded to computer 1852 in response to the above-mentioned request of the surveillance camera 10. In such a case, the downloaded blur correction program 1902 is executed by the CPU 1852A of the computer 1852.

Further, the computer 1852 may be provided outside the blur correction device 33. In such a case, the computer 1852 may control the blur correction device 33 in accordance with the blur correction program 1902.

As the hardware resource for executing the above-mentioned blur correction processing, the following various processors can be used. Examples of the processor include, as described above, software, that is, a CPU, which is a general-purpose processor that functions as a hardware resource for executing blur correction processing by executing a program. Further, examples of the processor include a dedicated electric circuit which is a processor having a circuit configuration specially designed for executing a specific processing such as FPGA, PLD, or ASIC. A memory is built into or connected to each processor, and each processor executes blur correction processing by using the memory.

The hardware resource that executes the blur correction processing may be composed of one of these various processors, or a combination of two or more processors of the same type or different types (for example, a combination of a plurality of FPGAs, or a combination of a CPU and an FPGA). Further, the hardware resource for executing the blur correction processing may be one processor.

As an example of the configuration using one processor, first, as represented by a computer such as a client and server, there is a form in which one processor is composed of a combination of one or more CPUs and software and this processor functions as a hardware resource for executing processing in the blur correction device 33. Secondly, as typified by SoC, there is a form in which a processor that realizes the functions of the entire system including a plurality of hardware resources for executing blur correction processing with one IC chip is used. As described above, the processing in the blur correction device 33 is realized by using one or more of the above-mentioned various processors as a hardware resource.

Furthermore, as the hardware structure of these various processors, more specifically, it is possible to use an electric circuit in which circuit elements such as semiconductor elements are combined.

Further, in each of the above embodiments, the surveillance camera 10 is described as an example of the imaging apparatus relating to the technique of the present disclosure, but the technique of the present disclosure is not limited to this. For example, instead of the surveillance camera 10, the technique of the present disclosure may be applied to various electronic devices such as a portable interchangeable lens camera, a portable fixed lens camera, a personal computer, a smart device, or a wearable terminal device. Even with these electronic devices, the same operations and effects as those of the surveillance camera 10 described in each of the above embodiments can be obtained.

Further, in each of the above embodiments, the imaging performed by the rolling shutter method is illustrated. However, the technique of the present disclosure is not limited to this, and the technique of the present disclosure is established even in a case where the imaging is performed by the global shutter method.

Moreover, the above-mentioned blur correction processing is only an example. Therefore, it is needless to say that unnecessary steps may be deleted, new steps may be added, or the processing order may be changed, without departing from the technical scope of the present disclosure.

The contents described and illustrated above are detailed explanations of the parts relating to the technique of the present disclosure, and are merely examples of the technique of the present disclosure. For example, the above description of the configuration, function, effect, and advantage is an example of the configuration, function, effect, and advantage of a portion relating to the technique of the present disclosure. Therefore, it is needless to say that unnecessary parts may be deleted, new elements may be added, or replacements may be made in the described contents and illustrated contents shown above without departing from the technical scope of the present disclosure. In addition, in order to avoid complications and facilitate understanding of the parts relating to the technique of the present disclosure, in the description contents and the illustrated contents shown above, the description about common technical knowledge and the like which require special explanation in order to enable the implementation of the technique of the present disclosure is not given.

As used herein, "A and/or B" is synonymous with "at least one of A or B". That is, "A and/or B" means that it may be only A, only B, or a combination of A and B. Further, in the present specification, in a case where three or more matters are connected and expressed by "and/or", the same concept as "A and/or B" is applied.

All documents, patent applications, and technical standards described in the present specification are incorporated into the present specification by reference to the same extent as in a case where the individual documents, patent applications, and technical standards were specifically and individually stated to be incorporated by reference.

What is claimed is:

1. A blur correction device comprising:
a processor; and
a memory that is built into or coupled to the processor, wherein the memory stores an unfinished image,
wherein the processor:
acquires an amount of blur correction used to correct blurring of an image obtained by imaging of an imaging element, during exposure for one frame in the imaging element, and
corrects the blurring by performing image processing, based on a most recently acquired amount of blur correction, on the unfinished image that is the image less than one frame that is being read from the imaging element, wherein the processor corrects the blurring by performing the image processing on the unfinished image stored in the memory, based on the amount of blur correction acquired during the exposure which is required to obtain the unfinished image.

2. The blur correction device according to claim 1, wherein the memory stores the image for each frame, and the unfinished image is an image for each of the images stored in the memory for each frame.

3. The blur correction device according to claim 1, wherein, in a case in which a first reading period in which the imaging element reads the image of a previous frame of previous and subsequent frames which are adjacent does not overlap with a second reading period in which the imaging element reads the image of the subsequent frame, the processor corrects the blurring by performing the image processing based on the amount of blur correction acquired during exposure between the first reading period and the second reading period, on the unfinished image of the subsequent frame.

4. The blur correction device according to claim 3, wherein the processor corrects the blurring by performing the image processing based on the amount of blur correction acquired throughout an entire exposure period for one frame between the first reading period and the second reading period, on the unfinished image of the subsequent frame.

5. The blur correction device according to claim 1, wherein the processor acquires the amount of blur correction during exposure of a specific line in a period in which exposure corresponding to the unfinished image is performed.

6. The blur correction device according to claim 1, wherein the processor acquires the amount of blur correction at a time, during the exposure of the first frame, earlier than a start point of reading the image from the imaging element.

7. A blur correction device comprising:
a processor; and
a memory that is built into or coupled to the processor,
wherein the processor
  acquires an amount of blur correction used to correct blurring of an image obtained by imaging of an imaging element, during exposure for one frame in the imaging element, and
  corrects the blurring in a first correction mode or a second correction mode,
  the first correction mode is a correction mode for correcting the blurring by performing image processing based on the amount of blur correction acquired during the exposure which is required to obtain the correction target image, on a correction target image that is an image for one frame included in a moving image obtained by imaging of an imaging element, and
the second correction mode is a correction mode for correcting the blurring by performing the image processing based on a most recently acquired amount of blur correction, on an unfinished image that is the image less than one frame that is being read from the imaging element,
wherein the processor corrects the blurring in a correction mode, which is determined in accordance with a reading start timing of starting reading of the image from the imaging element and an acquisition timing of the amount of blur correction, in the first correction mode and the second correction mode,
wherein, in imaging for one frame by the imaging element, the processor corrects the blurring in the first correction mode in a case in which the acquisition timing is before the reading start timing, and corrects the blurring in the second correction mode in a case in which the acquisition timing is later than the reading start timing.

8. The blur correction device according to claim 7, wherein the processor corrects the blurring in the first correction mode in a case in which a storage medium stores the moving image.

9. The blur correction device according to claim 7, wherein the processor corrects the blurring in the second correction mode in a case of displaying a live view image on a display.

10. The blur correction device according to claim 7, wherein the processor corrects the blurring in the first correction mode in a case of transmitting the moving image to an external device.

11. An imaging apparatus comprising:
the blur correction device according to claim 1; and
the imaging element.

12. A monitoring system comprising:
the imaging apparatus according to claim 11; and
a controller that performs at least one of control for displaying a corrected image obtained by causing a processor to correct blurring on a display or control for storing the corrected image in a storage device.

13. An imaging apparatus comprising:
the blur correction device according to claim 7, and
the imaging element.

14. A monitoring system comprising:
the imaging apparatus according to claim 13; and
a controller that performs at least one of control for displaying a corrected image obtained by causing a processor to correct blurring on a display or control for storing the corrected image in a storage device.

15. A non-transitory computer-readable storage medium storing a program for causing a computer, which is equipped with a processor and a memory built into or coupled to the processor and stores an unfinished image, to execute processing comprising:
  acquiring an amount of blur correction used to correct blurring of an image obtained by imaging of an imaging element, during exposure for one frame in the imaging element, and
  correcting the blurring by performing image processing, based on a most recently acquired amount of blur correction, on the unfinished image that is the image less than one frame that is being read from the imaging element,
  the blurring is corrected by performing the image processing on the unfinished image stored in the memory, based on the amount of blur correction acquired during the exposure which is required to obtain the unfinished image.

16. A non-transitory computer-readable storage medium storing a program for causing a computer to execute processing, the processing comprising:
  acquiring an amount of blur correction used to correct blurring of an image obtained by imaging of an imaging element, during exposure for one frame in the imaging element, and
  correcting the blurring in a first correction mode or a second correction mode,
  wherein the first correction mode is a correction mode for corrects the blurring by performing image processing based on the amount of blur correction acquired during the exposure which is required to obtain the correction target image, on a correction target image that is an image for one frame included in a moving image obtained by imaging of an imaging element, and
  the second correction mode is a correction mode for correcting the blurring by performing the image processing based on a most recently acquired amount of blur correction, on an unfinished image that is the image less than one frame that is being read from the imaging element, wherein the blurring is corrected in a correction mode, which is determined in accordance with a reading start timing of starting reading of the image from the imaging element and an acquisition timing of the amount of blur correction, in the first correction mode and the second correction mode, wherein, in imaging for one frame by the imaging element, the blurring is corrected in the first correction mode in a case in which the acquisition timing is before the reading start timing, and corrects the blurring in the second correction mode in a case in which the acquisition timing is later than the reading start timing.

\* \* \* \* \*